(12) United States Patent
Yeckley

(10) Patent No.: US 6,471,734 B1
(45) Date of Patent: Oct. 29, 2002

(54) CERAMIC AND PROCESS FOR THE CONTINUOUS SINTERING THEREOF

(75) Inventor: Russell L. Yeckley, Latrobe, PA (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/112,639

(22) Filed: Jul. 9, 1998

(51) Int. Cl.$^7$ .............................. C04B 35/599
(52) U.S. Cl. ................... 51/307; 51/309; 264/643; 264/652; 264/669; 264/670; 264/674; 264/683
(58) Field of Search .................. 264/643, 652, 264/669, 670, 674, 683; 51/307, 309

(56) References Cited

U.S. PATENT DOCUMENTS

| | | | |
|---|---|---|---|
| 4,488,871 A | 12/1984 | Cremer | 432/19 |
| 4,563,433 A | 1/1986 | Yeckley et al. | |
| 4,711,644 A | 12/1987 | Yeckley et al. | 51/307 |
| 4,818,635 A | 4/1989 | Esktrom et al. | 428/698 |
| 4,880,755 A | 11/1989 | Mehrota et al. | 501/96 |
| 5,081,079 A | 1/1992 | Ukyo et al. | 501/97 |
| 5,120,682 A | 6/1992 | Ukyo et al. | 501/96 |
| 5,141,367 A | 8/1992 | Beeghly et al. | 407/119 |
| 5,173,458 A * | 12/1992 | Nishioka et al. | 501/97 |
| 5,227,346 A | 7/1993 | Hwang et al. | 501/96 |
| 5,275,772 A * | 1/1994 | Yamamoto et al. | 264/683 |
| 5,275,986 A | 1/1994 | Yamamoto et al. | 501/98 |
| 5,316,856 A | 5/1994 | Suzuki et al. | 428/446 |
| 5,330,296 A | 7/1994 | Beeghly et al. | 407/114 |
| 5,350,258 A | 9/1994 | Beeghly et al. | 407/119 |
| 5,370,716 A | 12/1994 | Mehrotra et al. | |
| 5,382,273 A | 1/1995 | Mehrotra et al. | |
| 5,411,923 A | 5/1995 | Suzuki | 501/97 |
| 5,413,972 A | 5/1995 | Hwang et al. | 501/98 |
| 5,424,256 A * | 6/1995 | Yoshimura et al. | 501/97 |
| 5,476,025 A | 12/1995 | Beeghly et al. | 82/1.11 |
| 5,502,011 A | 3/1996 | Yamamoto et al. | 501/97 |
| 5,525,134 A | 6/1996 | Mehrotra et al. | |
| 5,628,590 A | 5/1997 | Beeghly et al. | 407/114 |
| 5,648,042 A | 7/1997 | Miller, Jr. | |
| 5,900,208 A | 5/1999 | Wittmer et al. | 266/44 |
| 5,908,798 A | 6/1999 | Chen et al. | 501/98.2 |
| 5,965,471 A | 10/1999 | Brandt | 501/98.2 |
| 5,990,026 A | 11/1999 | Baek et al. | 501/98.1 |
| 6,043,176 A | 3/2000 | Brandt | 501/982 |

FOREIGN PATENT DOCUMENTS

| | | |
|---|---|---|
| EP | 0796828 | 9/1997 |
| WO | 8203072 | 9/1982 |
| WO | 9823554 | 6/1998 |

OTHER PUBLICATIONS

International Search Report in PCT/US99/14231 mailed Jun. 9, 2000.

Wittmer et al., Continuous and Batch Sintering of Silicon Nitride, American Ceramic Society Bulletin, vol. 72, No. 6 (Jun., 1993), pp. 129–137.

(List continued on next page.)

*Primary Examiner*—James Derrington
(74) *Attorney, Agent, or Firm*—John J. Prizzi

(57) ABSTRACT

A continuous process for the manufacture of a ceramic sintered compact wherein the process comprises the steps of: forming a green compact from a powder mixture comprising a first component comprising compounds which contain elements of silicon, aluminum, oxygen and nitrogen; and the powder mixture further comprising a second component comprising a compound of at least one element selected from the group consisting of yttrium, scandium, cerium, lanthanum and the metals of the lanthanide series, and the second component comprising between 0.1 and 10 weight percent of the powder mixture; heat treating the green compact wherein the heat treatment comprises continuously passing the green compact through at least one heating zone so as to produce a sintered compact.

36 Claims, 13 Drawing Sheets

OTHER PUBLICATIONS

Wittmer et al. Comparison of Continuous Sintering to Batch Sintering of $Si_3N_4$, Ceramic Bulletin, vol. 70, No. 9, (1991) pp. 1519–1527.

Wittmer et al., Continuous Sintering of Si3N4 in a Controlled Atmosphere Belt Furnace, Ceramic Eng. Sci. Proc., 13 [7–8], pp. 546–562 (1992).

* cited by examiner

CERAMIC AND PROCESS FOR THE CONTINUOUS SINTERING THEREOF

BACKGROUND

The invention pertains to a continuous heat treating (e.g., sintering) process for the production of ceramics, as well as the resulting ceramic wherein these ceramics may be used as cutting inserts, nozzles, wear parts and the like.

In the past, ceramics have been produced using a batch process. These ceramics have included silicon nitride-based ceramics, SiAlON-based ceramics, alumina-based ceramics, zirconia-based ceramics, titanium nitride-based ceramics, titanium carbide-based ceramics, and titanium carbonitride-based ceramics. These ceramics have also optionally contained additives which included whiskers such as, for example, silicon carbide, titanium carbide and/or titanium nitride whiskers so as to provide for whisker-reinforced ceramics. These additives have also comprised zirconia, as well as the nitrides, carbides, borides and carbonitrides of titanium, hafnium and zirconium.

Referring specifically to SiAlON materials, SiAlON-based ceramics have been produced using a batch process. U.S. Pat. No. 4,563,433 to Yeckley et al. for a Ceramic Material and Method of Manufacture (which is hereby incorporated by reference herein) describes such a batch process wherein a plurality of green compacts are buried in a boron nitride/silicon nitride setting powder mixture in a graphite pot. The pot, setting powder and green compacts are placed in a graphite element resistance-heated batch furnace, and then subjected to a heat treatment (e.g., sintering) process. The result is a densified SiAlON-based ceramic made according to a batch process.

U.S. Pat. No. 5,382,273 to Mehrotra et al. for a Silicon Nitride Ceramic and Cutting Tools Made Thereof, U.S. Pat. No. 5,370,716 to Mehrotra et al. for a High Z SiAlON and Cutting Tools Made Therefrom and Method of Using, and U.S. Pat. No. 5,525,134 to Mehrotra et al. for a Silicon Nitride Ceramic and Cutting Tool Made Thereof (all of these patents are hereby incorporated by reference herein) each pertain to ceramics made via a batch process. Although the batch-processed ceramics have adequate physical properties and performance characteristics for applications such as cutting inserts, these ceramics still exhibit certain disadvantages.

Some SiAlON-based ceramics, e.g., cutting inserts, as well as silicon nitride-based ceramics (e.g., cutting inserts), must present a uniform appearance on their surface so as to be visually pleasing. During the batch process, a reaction layer forms on and near the surface of the cutting insert. In batch processing, this surface reaction layer typically has a nominal thickness between about 0.010 inches (0.254 millimeters [mm]) and about 0.015 inches (0.381 mm). This surface reaction layer causes a change in the color of the surface of the cutting insert so that a batch-processed SiAlON-based or silicon nitride-based cutting insert does not exhibit a uniform surface color or appearance. In order to obtain the desired uniform surface appearance, the surface of the batch-processed cutting insert must be ground at least 0.010–0.015 inches so as to remove the surface reaction layer. There would be a significant cost savings associated with a process that would eliminate the necessity for the above-described grinding step. There would also be a significant cost savings associated with a process that would reduce the amount of grinding necessary to achieve an acceptable surface appearance from the amount of grinding required for a batch-processed cutting insert.

The process for making a batch-processed ceramic part (e.g., a cutting insert) requires that the ceramic part be physically removed from the tray in which it was delubed, and then physically placed in the tray in which it is batch processed. It is apparent that this transfer step adds an additional step, as well as labor costs, to the overall batch process. It would be desirable to be able to provide a process in which the ceramic part remained in the same container or tray from the delubing operation through the sintering operation. Such an advantage would reduce the number of manufacturing steps and the amount of labor needed in the production of a ceramic part.

SUMMARY

In one form thereof, the invention is a continuous process for the manufacture of a ceramic sintered compact wherein the process comprises the steps of: forming a green compact from a powder mixture comprising a first component comprising compounds which contain elements of silicon, aluminum, oxygen and nitrogen; and the powder mixture further comprising a second component comprising a compound of at least one element selected from the group consisting of yttrium, scandium, cerium, lanthanum and the metals of the lanthanide series, and the second component comprising between 0.1 and 10 weight percent of the powder mixture; heat treating the green compact wherein the heat treatment comprises: continuously passing the green compact through at least one heating zone so as to produce a sintered compact.

In another form thereof, the invention is a continuous process for the manufacture of a ceramic sintered compact wherein the process comprises the steps of: forming a green compact from a powder mixture of silicon nitride and one or more sintering aids; subjecting the green compact to a heat treatment wherein the heat treatment comprises continuously passing the green compact through at least one heating zone so as to form the sintered compact and wherein the heating zone is at a temperature greater than 1750° C.; and the ceramic comprising a beta-silicon nitride phase and an intergranular phase.

In still another form thereof, the invention is a ceramic cutting insert which comprises a cutting insert body which has an as-molded rake face and an as-molded flank face wherein the rake face intersects with the flank face to form a cutting edge at the intersection. The cutting body has at least one of the as-molded rake face and the as-molded flank face does not have a surface reaction layer.

In still another form thereof, the invention is a ceramic cutting insert that comprises a cutting insert body which has a microstructure including pockets of a glassy phase. At least ninety percent of the pockets of the glassy phase have a major axis which is of a dimension of one micron or less.

In another form thereof, the invention is a sintered ceramic body which comprises a substrate that comprises a two-phase composite of alpha'-SiAlON and beta'SiAlON, and a glassy phase. The substrate presents a surface. The substrate has a surface region extending inwardly from the surface with a bulk region beneath the surface region. The surface region has a higher alpha'-SiAlON content than the bulk region.

BRIEF DESCRIPTION OF THE DRAWINGS

The following is a brief description of the drawings which form a part of this patent application.

DETAILED DESCRIPTION

Figure 1:
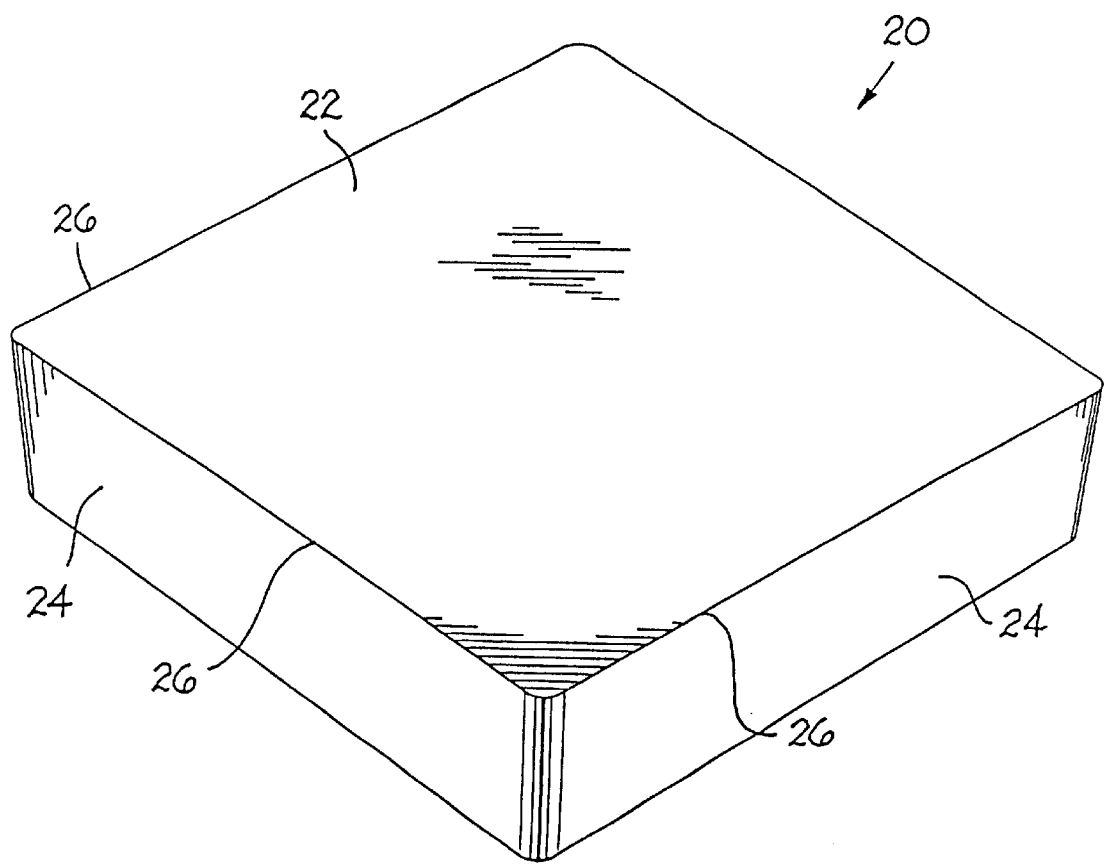
FIG. 1 is an isometric view of an embodiment of a ceramic cutting insert of the instant invention.

Referring to the drawings, there is shown in FIG. 1 a ceramic cutting insert generally designated 20. Cutting insert 20 has a rake surface 22, and flank surfaces 24. There are cutting edges 26 at the intersections of the rake surface 22 and the flank surfaces. The rake face and the flank face (or both) may be in an as-molded condition. The cutting insert of the instant invention may take on any one of a variety of cutting insert geometries so that the scope of the instant invention is not intended to be limited to the geometry of the specific cutting insert illustrated in FIG. 1. This description is of a cutting insert, however, the invention has application to other kinds of ceramic parts such as nozzles, wear parts, and the like. In addition to SiAlON-based and silicon nitride-base materials, the ceramic cutting inserts, as well as the process for making such ceramic cutting inserts, pertain without limitation to ceramic materials such as, for example, alumina, alumina-based ceramics (e.g., alumina+titanium carbide, alumina+zirconia, alumina+zirconia+silicon carbide whiskers, and alumina+silicon carbide whiskers), zirconia, zirconia-based ceramics, titanium carbide-based ceramics, titanium nitride-based ceramics, titanium carbonitride-based ceramics (e.g, titanium carbonitride+silicon carbide whiskers+alumina), titanium boride-based ceramics, hafnium boride-based ceramics, and zirconium boride-based ceramics, and the like.

As discussed above in the background, it would be advantageous to provide a process for the production of ceramics (including SiAlON-based and silicon nitride-based ceramics) that would eliminate the need for a post-sintering (or heat treating) grinding (or material removal) step so as to remove the surface reaction layer so as to provide an acceptable surface appearance. It would also be advantageous to provide a process for the production of ceramics (including SiAlON-based and silicon nitride-based ceramic cutting inserts) that would result in a much thinner surface reaction layer so as to thereby reduce the amount of grinding necessary to remove the surface reaction layer so as to provide an acceptable surface appearance. It would also be advantageous to provide a process for the production of ceramics (including SiAlON-based and silicon nitride-based ceramic cutting inserts) that would eliminate the need to physically transfer the delubed green compacts to another container or tray for subsequent sintering.

In an effort to achieve these advantages with a process for the production of a SiAlON-based or a silicon nitride-based ceramic, the applicant has discovered that the continuous sintering of green compacts produces a fully densified SiAlON-based (or silicon nitride-based) sintered compact which either has an acceptable surface condition without the need to remove (e.g., grind) any material (e.g., a reaction layer) from the surface thereof or has a much thinner surface reaction layer than what existed in batch-processed ceramic parts. In the case of the continuously-processed sintered compact with the thinner surface reaction layer, less grinding is required to achieve an acceptable surface appearance than for the batch-processed sintered compact. In this regard, the batch-processed sintered compact typically required 0.010–0.015 inches (0.254–381 mm) of grinding while the continuously-processed cutting insert requires only 0.005 inches (0.127 mm) or less of grinding. Applicant's continuous process also eliminates the need to physically transfer the delubed green compact to another container for subsequent sintering since the compacts remain in the same container.

A number of examples of SiAlON-based ceramic green compacts were processed according to the continuous sintering process. The following description describes the continuously-processed green compacts and the batch-processed green compacts. In regard to the specific examples, the following definitions of the phases are applicable: (1) beta'-SiAlON phase is a hexagonal phase having the general formula $Si_{6-z}Al_zO_zN_{8-z}$ wherein z ranges between zero and about 4.2; (2) alpha'-SiAlON is a hexagonal phase having the general formula $(Si,Al)_{12}M_x(O,N)_{16}$ wherein M is Li, Ca, Y or some other lanthanide and X has a theoretical maximum value equal to 2 when M is Ca, but when M is Y, the practical maximum value of X is equal to 0.7; (3) alpha-silicon nitride is an unsubstituted allotrope of silicon nitride; (4) N-YAM is a monoclinic phase of the formula $Y_4Si_2O_7N_2$; (5) Y-N-α-Wollastonite is a monoclinic phase of the formula $YSiO_2N$; and (6) YAG is a cubic phase of the formula $Y_3Al_5O_{12}$; and (7) B phase ($Y_2SiAlO_5N$).

In regard to the production of the green cutting insert compacts, the powder components are ball milled, dried, screened, and then agglomerated with a lubricant. This powder mixture is then uniaxially pressed into the green cutting insert compacts. These green cutting insert compacts are delubed in an oven, and after delubing are then continuously processed according to the continuous process of the invention. It should be appreciated that as an option for the continuous process, the delubing step may take place in a furnace that is in line with the sintering furnace so that the green compacts are continuously delubed and sintered.

Figure 14:
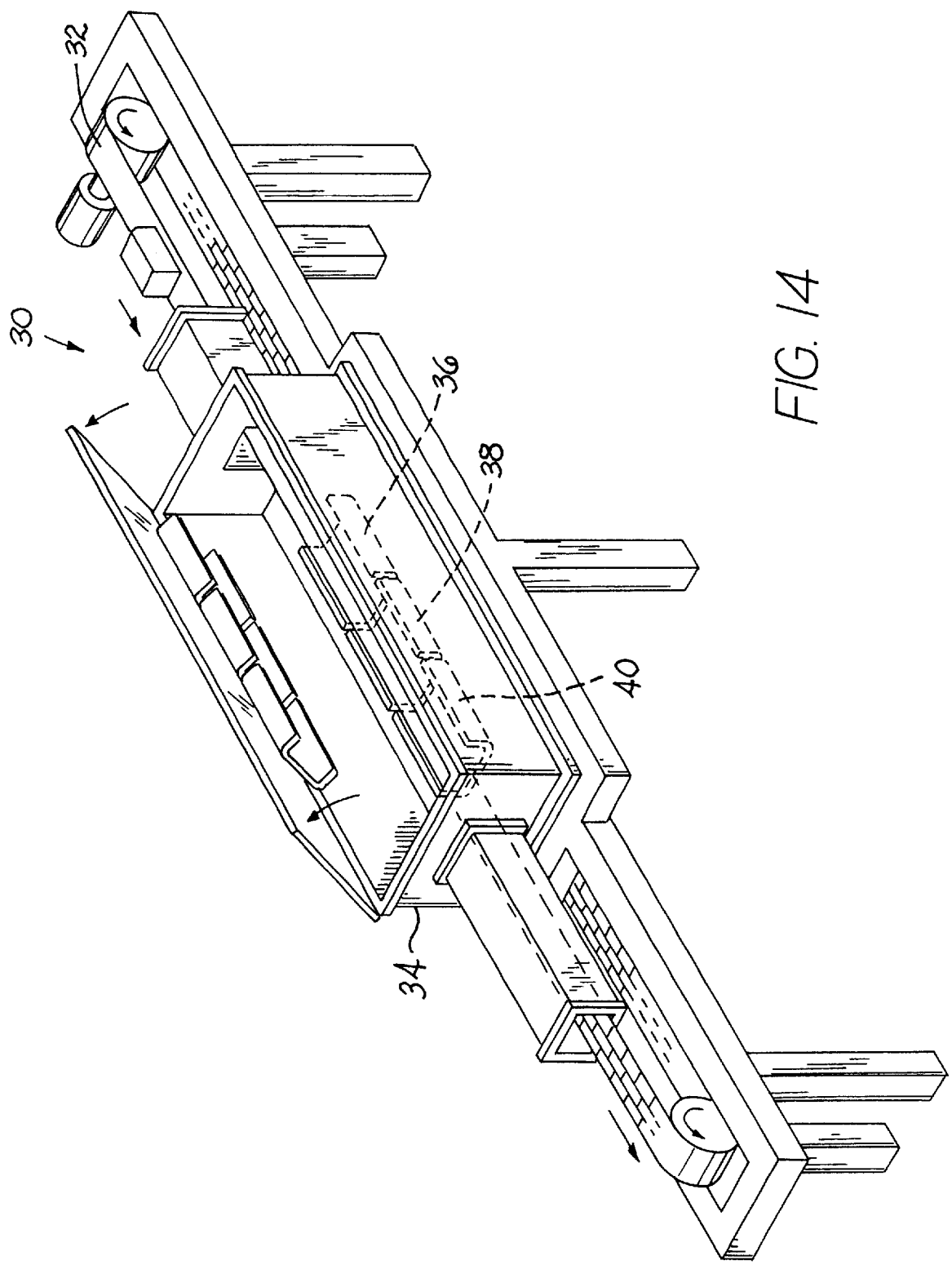
FIG. 14 is an isometric view of a belt sintering furnace used for the continuous processing of green compacts into sintered compacts.

Referring to FIG. 14, the continuous process was conducted in a belt style furnace 30 wherein furnace 30 is like the furnace set forth U.S. Pat. No. 5,648,042 to Miller, Jr. entitled High-Temperature Belt Furnace Apparatus and Method of Using Same, which is hereby incorporated by reference herein. There are essentially three heating zones of the belt furnace through which the parts move on a silicon carbide belt 32. The furnace preferably contains three heating zones; however, the number of heating zones may vary depending upon the particular application. Thus, the presence of three heating zones in the specific embodiment of the furnace herein should not be considered limiting to the invention.

These heating zones are in a furnace region 34 and each one is twelve inches (30.48 centimeters [cm]) long. These heating zones comprise a first heating zone 36 into which the parts first pass. The first heating zone 36 may be at any selected temperature, but it is preferable that the temperature in the first heating zone 36 be at or near the target sintering temperature. When the green compacts enter the first heating zone they typically are heated at a rate of between 150° C./minute and 200° C./minute until they reach the temperature in the first heating zone.

The parts pass through the first heating zone 36 into the second heating zone 38. The second heating zone 38 may be at any selected temperature, but typically is at the maximum (or target) sintering temperature for the process.

The parts pass through the second heating zone 38 into the third heating zone 40. The third heating zone 40 may be at any selected temperature, but it is typical that the third heating zone is at a temperature equal to the temperature of the second heating zone. It should be appreciated that the temperatures of the heating zones may vary depending upon the specific application. A nitrogen atmosphere is maintained in all three heating zones by introducing flowing nitrogen gas therein.

In the continuous process to produce the examples, the parts (e.g., green cutting insert compacts) were loaded into boron nitride saggers of three different sizes [as measured in inches] (4×4×1, and 4×4×2 and 4×8×4). These saggers each had lids loosely fitted on them. The use of lids avoided direct radiation heating of the compacts and minimized the volatization of the constituent materials from the compacts. Setting powder was not used in this continuous process. The saggers and the green compacts were then continuously passed through the belt furnace 30. The end result was that the green compacts were transformed into fully densified SiAlON-based sintered compacts or cutting inserts, except for any necessary edge preparation.

Examples 1–36 use any one of three compositions, i.e., Composition A, Composition B, and Composition C. The powder components of the compositions is set forth in Table I below.

TABLE I

Components (Weight Percent) of Compositions A, B and C

| Composition/ Component | Silicon Nitride | Aluminum Nitride | Alumina | Yttria |
| --- | --- | --- | --- | --- |
| A | 85.4 | 6.2 | 3.7 | 4.7 |
| B | 63.35 | 9.26 | 22.68 | 4.7 |
| C | 91.6 | 1.6 | 1.3 | 5.5 |

The powder components are briefly described as follows.

For composition A, the silicon nitride was a lower purity nitrided silicon nitride available from Herman C. Starck of New York, New York (USA). For Compositions B and C, the silicon nitride was Grade SNE10 silicon nitride powder from Ube Industries, Ltd. of Tokyo, Japan. For all of the compositions, the aluminum nitride was Grade C AlN powder available from Herman C. Starck, Inc. of New York, N.Y. (USA). For all of the compositions, the alumina was Grade Ceralox HPA 0.5 and is available from Ceralox Corporation of Tucson, Ariz. (USA). For all of the compositions, the yttria powder was fine grade yttria from Herman C. Starck, Inc. of New York, N.Y. (USA). More detailed descriptions of these powders is found in U.S. Pat. No. 5,370,716 to Mehrotra et al., which has already been incorporated by reference herein.

Referring to the processing of sintered compact Examples 1–6, Table II below sets forth the various processing parameters of the SiAlON-based sintered compacts of Composition A. Referring to Table I, the "Ex." refers to the examples "T1" refers to the temperature (° C.) in the first heating zone, "T2" refers to the temperature (° C.) in the second heating zone, "T3" refers to the temperature (° C.) in the third heating zone, the belt speed refers to the speed of the silicon carbide belt in inches per minute, and the total time in the heating zones is the sum of the time in minutes the compact spends in the three heating zones.

TABLE II

Processing Parameters for the SiAlON-Based Sintered Compacts (Examples 1–6) of Composition A

| Ex. | T1 | T2 | T3 | Belt Speed (inches/minute) | Total Time in the Heating Zone (minutes) |
| --- | --- | --- | --- | --- | --- |
| 1 | 1720 | 1720 | 1720 | 0.6 | 60 |
| 2 | 1720 | 1720 | 1720 | 0.3 | 120 |
| 3 | 1760 | 1760 | 1760 | 0.6 | 60 |

TABLE II-continued

Processing Parameters for the SiAlON-Based
Sintered Compacts (Examples 1–6) of Composition A

| Ex. | T1 | T2 | T3 | Belt Speed (inches/minute) | Total Time in the Heating Zone (minutes) |
|---|---|---|---|---|---|
| 4 | 1760 | 1760 | 1760 | 0.3 | 120 |
| 5 | 1800 | 1800 | 1800 | 0.6 | 60 |
| 6 | 1600 | 1760 | 1760 | 0.4 | 90 |

Table III below sets forth the physical properties of the as-sintered silicon nitride-based sintered compacts (Examples 1–6) of Composition A. The microstructure of the sintered compacts of composition A is set forth in Table III below.

TABLE III

Physical Properties for the As-Sintered SiAlON-Based
Sintered Compacts (Examples 1–6) of Starting
Composition A

| Example No. | Weight Loss (%) | Density (g/cc) | Vickers Hardness (GPa) [18.5 Kg Load] | Toughness $K_{IC}$(E&C) (MPa m$^{1/2}$) | Percent of Alpha'-SiAlON Phase Present* |
|---|---|---|---|---|---|
| 1 | 0.6  | 3.24 | 16.30 | 5.93 | 20.1$^{(1)}$ |
| 2 | 0.63 | 3.25 | 16.29 | 6.41 | 20.6 |
| 3 | 0.73 | 3.24 | 16.16 | 6.40 | 19.2 |
| 4 | 0.95 | 3.25 | 16.29 | 6.69 | 22.5$^{(2)}$ |
| 5 | 1.01 | 3.25 | 15.68 | 6.37 | 16.5 |
| 6 | 0.76 | 3.26 | 16.07 | 6.29 | 19.9 |

*The remainder of the phases comprises Beta'-SiAlON, except for glass and the phases noted in Notes (1) and (2) below. The reported percent is taken as a percent of the total crystalline phases as determined by X-ray diffraction.
$^{(1)}$alpha-silicon nitride is present; and
$^{(2)}$1.6 weight percent YAM is present In regard to the results of the continuous processing of the SiAlON-based sintered compacts of Composition A, the weight loss (as measured as a percentage of the weight of the green cutting insert compact) seemed to be dependent upon the temperature and the duration. The weight loss increased with the higher temperatures and with the longer sintering durations. It seems that the weight loss was due to volatization from the compact of some of the constituent material. The extent of the weight loss is comparable to the weight loss in batch-processed sintered compacts.

The density (as measured in grams per cubic centimeter) was essentially fully dense and comparable to the density of sintered compacts obtained by a batch process.

Figure 5:
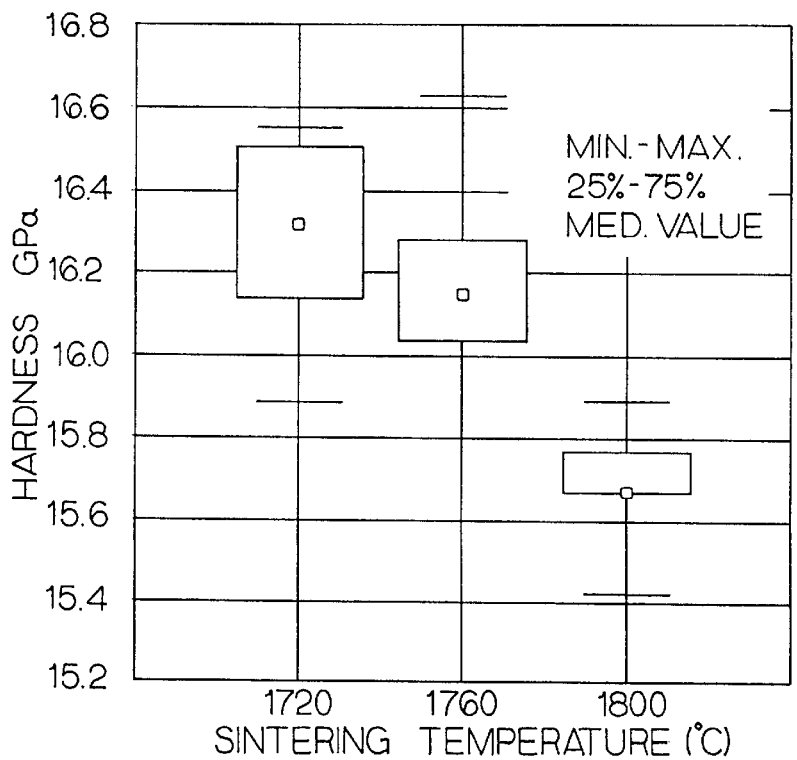
FIG. 5 is a box and whisker plot showing the Vickers hardness (GPa) [18.5 Kg Load] verses the sintering temperature (° C.) for continuously-processed SiAlON-based sintered compacts of Composition A.

Referring to the box and whisker plot of FIG. 5, the Vickers hardness (18.5 Kg Load),as measured in gigapascals [GPa], was dependent upon the temperature with the hardness decreasing at 1800° C. wherein a higher hardness was obtained at a sintering temperatures of either 1720° C. or 1760° C.

Figure 6:
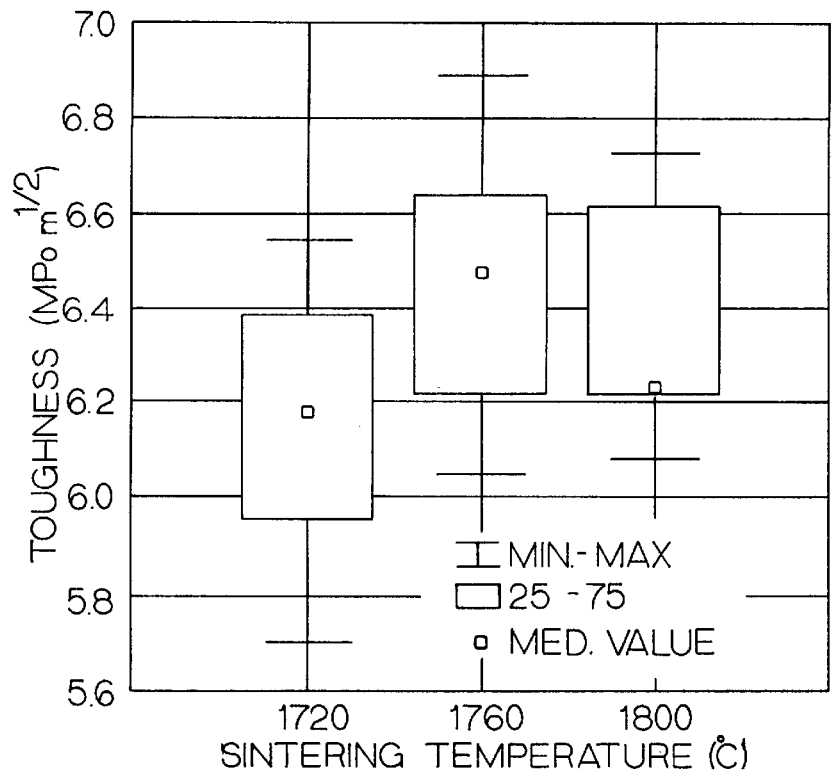
FIG. 6 is a box and whisker plot showing the fracture toughness $K_{IC}$(E&C) (MPa m$^{1/2}$) verses the sintering temperature (° C.) for continuously-processed SiAlON-based sintered compacts of Composition A.
Figure 7:
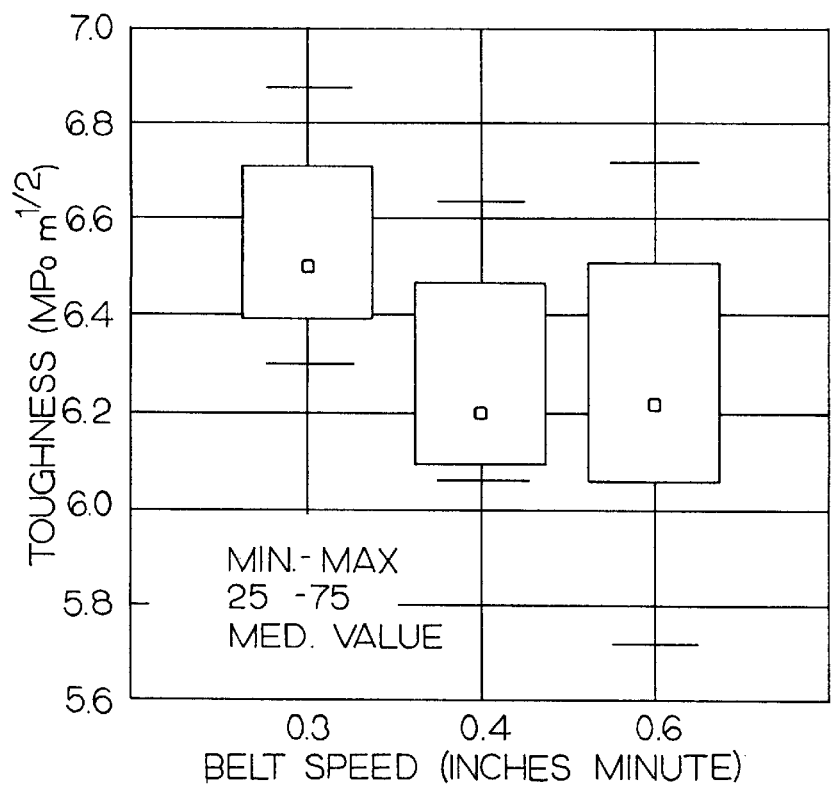
FIG. 7 is a box and whisker plot showing the fracture toughness $K_{IC}$(E&C) (MPa m$^{1/2}$) verses the belt speed (inches per minute) for continuously-processed SiAlON-based sintered compacts of Composition A.

Referring to the box and whisker plots of FIGS. 6 and 7, the fracture toughness ($K_{IC}$(E&C)) as measured in MPa m$^{1/2}$ was dependent upon the sintering temperature and the belt speed. As used herein, the designation "$K_{IC}$(E&C)" means fracture toughness measured by the Evans and Charles method on a polished surface employing the Palmquist indentation technique using a 18.5 kg load on a Vickers indentor (see Evans and Charles, "Fracture Toughness Determination by Indentation", J. American Ceramic Society, Vol. 59, No. 7–8, pp. 371–372). The fracture toughness of the sintered compact sintered at 1720° C. was slightly lower than the toughness of the sintered compact which was sintered at 1760° C. or at 1800° C. The toughness of the sintered compact was highest for the lowest belt speed of 0.3 inches/minute.

In regard to the microstructure of the sintered compacts of Examples 1–6 of Composition A, the alpha'-SiAlON and beta'-SiAlON content was within an acceptable range. The alpha-silicon nitride content was present for the sintered compact sintered at 1720° C. for 60 minutes. Beta-phase of silicon nitride was not detected in any of the continuously-processed sintered compacts of Composition A. The powder for Composition A was contaminated so that there were numerous pits in the sintered compacts.

Figure 8:
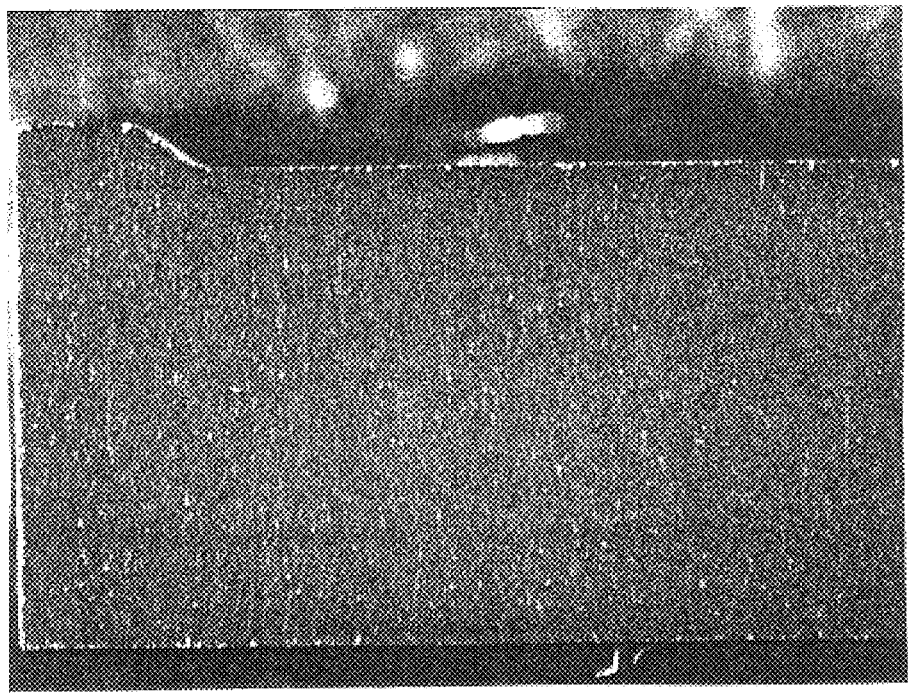
FIG. 8 is a photomicrograph at a magnification of 11× of a polished cross-section of a continuously-processed SiAlON-based sintered compact of Composition A sintered at a temperature of 1800° C. for sixty minutes and wherein the photomicrograph shows the surface of the sintered compact.
Figure 9:
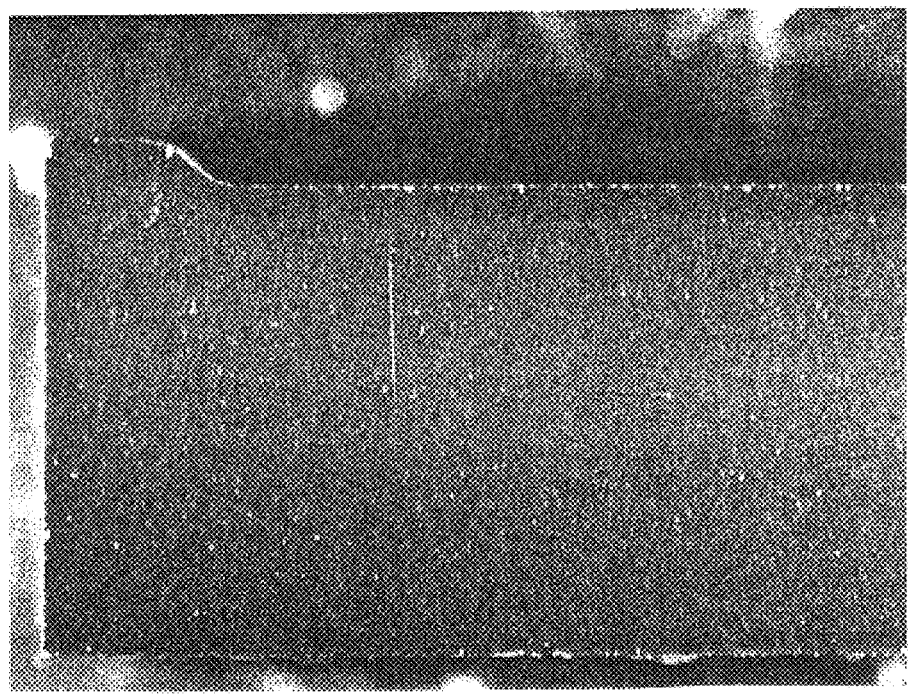
FIG. 9 is a photomicrograph at a magnification of 11× of a polished cross-section of a continuously-processed SiAlON-based sintered compact of Composition A sintered at a temperature of 1760° C. for one hundred twenty minutes and wherein the photomicrograph shows the surface of the sintered compact.
Figure 10:
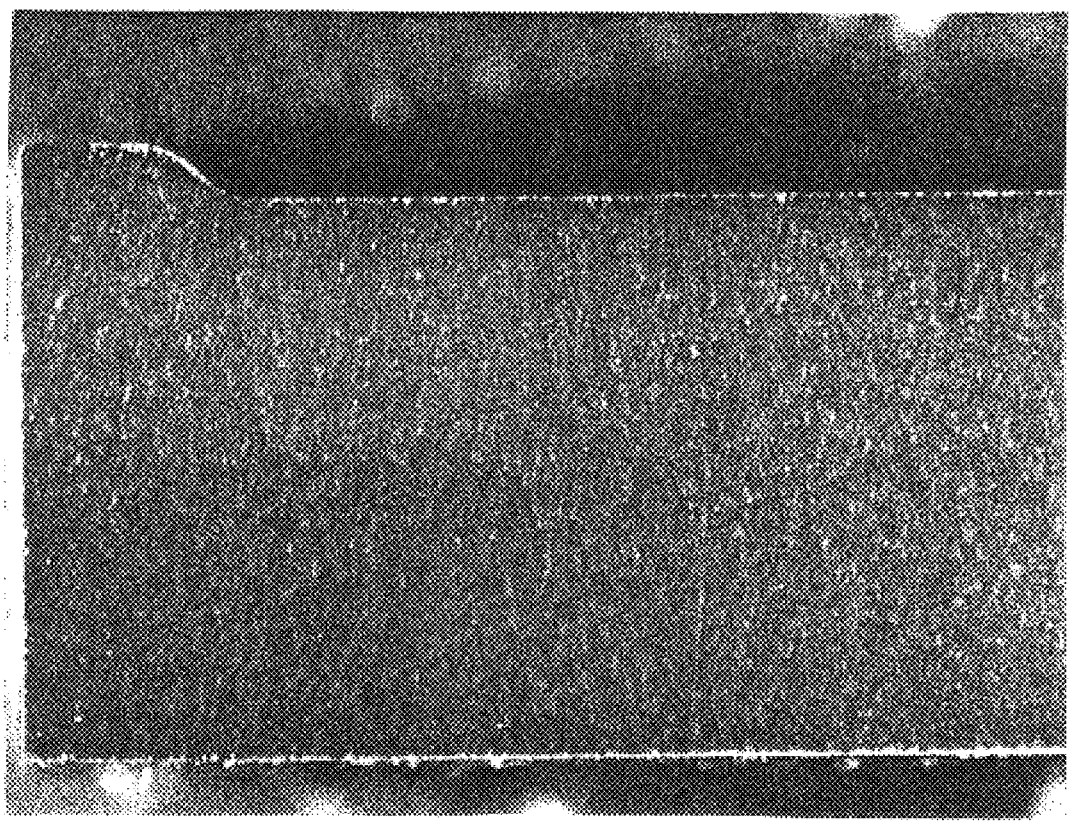
FIG. 10 is a photomicrograph at a magnification of 11× of a polished cross-section of a continuously-processed SiAlON-based sintered compact of Composition B sintered at 1760° C. for sixty minutes and wherein the photomicrograph shows the surface of the sintered compact.

Referring to FIGS. 8 and 9, visual observation showed that there was little or no reaction layer for the sintered compacts sintered at 1800° C. for 60 minutes (FIG. 8), but there was an apparent reaction layer for the sintered compact sintered at 1760° C. for 120 minutes (FIG. 9). However, the depth of the reaction layer of FIG. 9 was thinner than the typical surface reaction layer found in batch-processed sintered compacts.

SiAlON-based sintered compacts of a Composition B (Examples 7–12) were processed in a continuous fashion like the sintered compacts of Composition A. The continuous processing occurred in the same belt style furnace used for processing sintered compact Examples Nos. 1–6.

Table IV and Table V below set forth the processing parameters and the physical properties for the continuously-processed sintered compacts (Examples 7–12) of Composition B. The terms "T1", "T2", "T3", the belt speed, and the total time in the heating zone mean the same thing for Table IV as for Table II.

TABLE IV

Processing Parameters for the SiAlON-Based Sintered
Compacts (Examples 7–12) of Composition B

| Ex. | T1 | T2 | T3 | Belt Speed (inches/minute) | Total Time in the Hot Zones (minutes) |
|---|---|---|---|---|---|
| 7  | 1720 | 1720 | 1720 | 0.6 | 60 |
| 8  | 1720 | 1720 | 1720 | 0.3 | 120 |
| 9  | 1760 | 1760 | 1760 | 0.6 | 60 |
| 10 | 1760 | 1760 | 1760 | 0.3 | 120 |
| 11 | 1800 | 1800 | 1800 | 0.6 | 60 |
| 12 | 1600 | 1760 | 1760 | 0.4 | 90 |

Table V below sets forth the physical properties of the as-sintered SiAlON-based sintered compacts of Composition B.

TABLE V

Physical Properties for the As-Sintered SiAlON-Based Sintered Compacts (Examples 7–12) of Composition B

| Example No. | Weight Loss (%) | Density (g/cc) | Vickers Hardness (GPa) [18.5 kg Load] | Fracture Toughness $K_{IC}$(E&C) (MPa m$^{1/2}$) | Crystalline Phases Present |
|---|---|---|---|---|---|
| 7 | 0.86 | 3.18 | 15.10 | 5.70 | beta'-SiAlON |
| 8 | 0.82 | 3.19 | 14.83 | 5.86 | beta'-SiAlON |
| 9 | 0.88 | 3.19 | 14.82 | 5.83 | beta'-SiAlON |
| 10 | 0.88 | 3.19 | 14.66 | 6.01 | beta'-SiAlON |
| 11 | 0.93 | 3.19 | 14.85 | 5.63 | beta'-SiAlON |
| 12 | 0.84 | 3.19 | 14.77 | 5.56 | beta'-SiAlON |

The weight loss, the density, the Vickers hardness, and the fracture toughness mean the same thing for Table V as for Table III.

In regard to the results set forth in Table IV and Table V, the weight loss appeared to be dependent on the temperature and the duration in that the weight loss increased with an increase in the temperature and an increase in the sintering duration. As in the case of the sintered compacts of Composition A, the weight loss seems to have been due to the volatization of the constituent materials. The extent of weight loss is comparable to that for batch-processed sintered compacts of the same composition.

Figure 2:
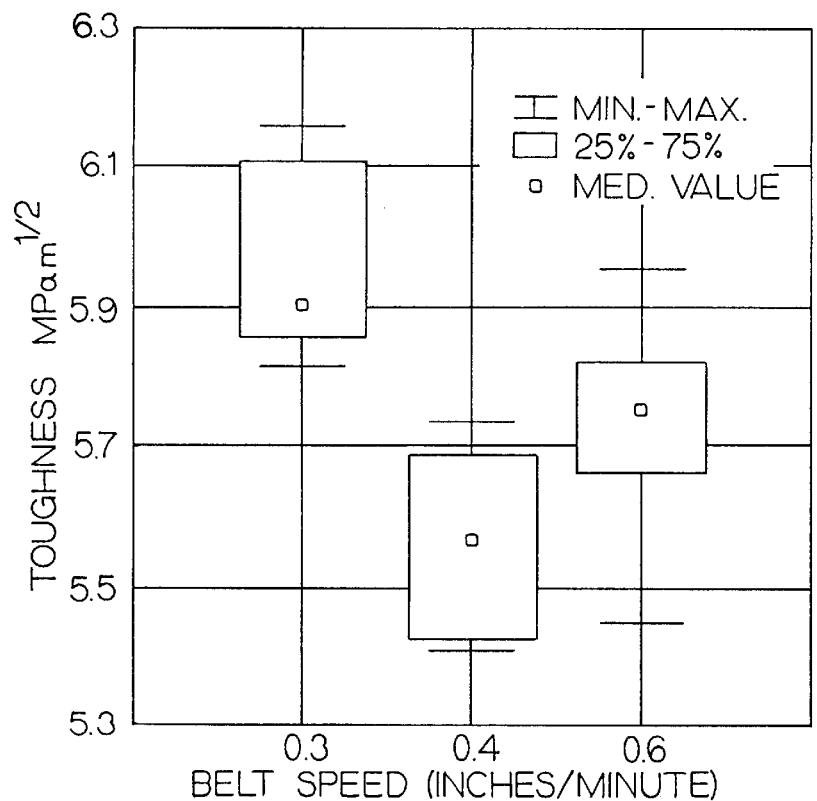
FIG. 2 is a box and whisker plot showing the fracture toughness [$K_{IC}$(E&C)] (MPa m$^{1/2}$) verses the belt speed (inches per minute) for continuously-processed SiAlON based sintered compacts of Composition B.

The density of the sintered compacts was greater than the target density of 3.16 grams per cubic centimeter. The Vickers hardness (18.5 Kg load) did not appear to be dependent upon the continuous sintering conditions. The fracture toughness [$K_{Ic}$(E&C)] of the sintered compacts of Composition B was higher than the target range of 4.3 to 5.7 MPa m$^{1/2}$, but appeared to be dependent upon the belt speed of the continuous process (FIG. 2). A slower belt speed yielded a higher fracture toughness in that the two highest fracture toughness values were of sintered compacts processed at the slowest belt speed of 0.3 inches per minute.

Figure 3:
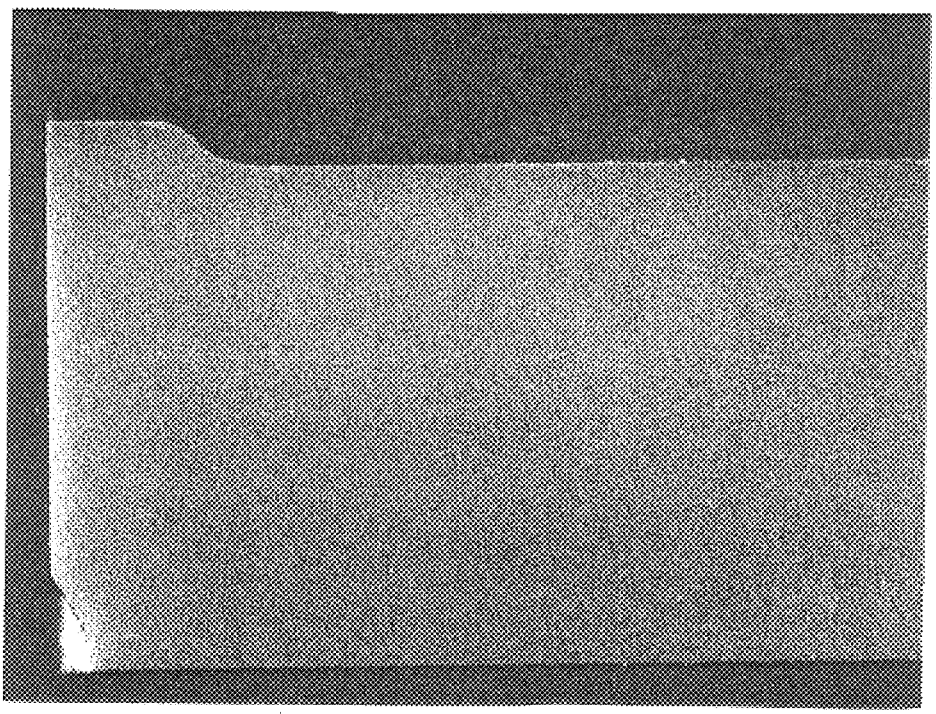
FIG. 3 is a photomicrograph at a magnification of 11× of a polished cross-section of a continuously-processed SiAlON-based sintered compact of Composition B sintered at a temperature of 1800° C. for sixty minutes and wherein the photomicrograph shows the surface of the sintered compact.
Figure 4:
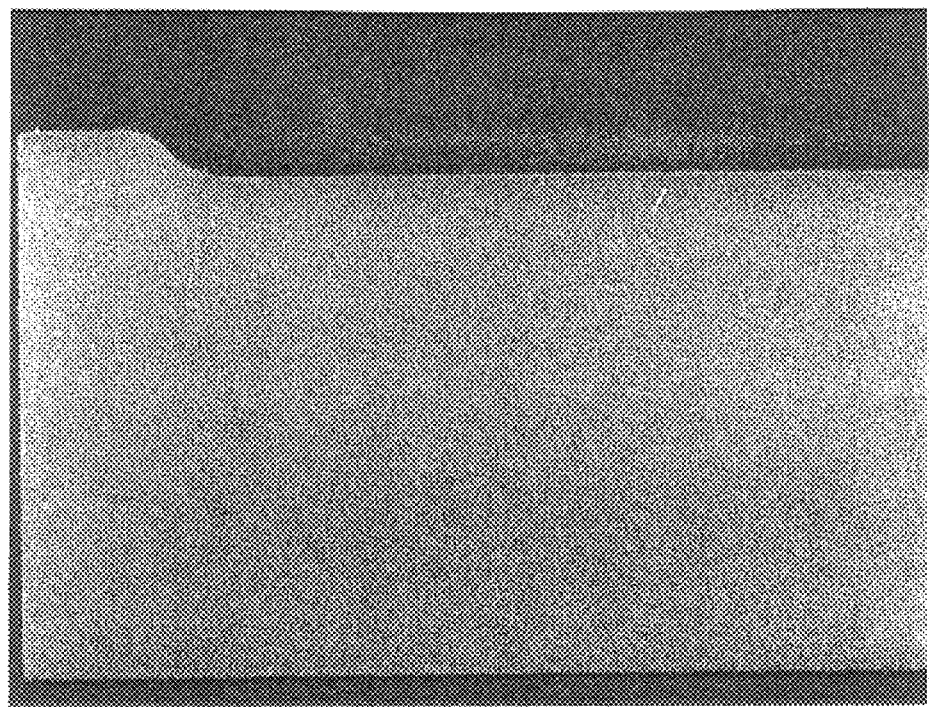
FIG. 4 is a photomicrograph at a magnification of 11× of a polished cross-section of a continuously-processed SiAlON-based sintered compact of Composition B sintered at a temperature of 1760° C. for one hundred twenty minutes and wherein the photomicrograph shows the surface of the sintered compact.

In regard to the microstructure, a beta'-SiAlON (z=3) phase was the only crystalline phase present in the examples, except for the sintered compact which was sintered at 1760° C. for 120 minutes wherein a minor amount of SiAlON phase was present in this sintered compact. The uniformity of the microstructure of the sintered compacts was excellent. Referring to FIGS. 3 and 4, the sintered surfaces were very clean wherein no reaction layer was observed on the surface of the sintered compacts of Examples 7–12.

Overall, sintered compact Examples 1–6 and sintered compact Examples 7–12 show that the sintered compacts processed according to the continuous process produced sintered compacts with acceptable physical properties and a clean surface either without a reaction surface layer or with only a thin surface reaction layer. In the case where there was no surface reaction layer, there was no need to utilize a grinding step to achieve an acceptable surface appearance. In the case where there was a thin surface reaction layer, only a small amount of grinding was necessary to achieve an acceptable surface appearance. Furthermore, the continuous process did not require the delubed green cutting insert compacts to be physically transferred into a separate container for post-delubing continuous processing in the belt furnace.

In a comparison of the physical properties of a continuous-processed sintered compact of Composition B and a batch-processed sintered compact of Composition B, it was found that the continuously-processed sintered compact had improved toughness and hardness properties. The continuous processing parameters are set forth below: (1) green compacts were placed in boron nitride boats without setting powder; (2) the heating rate was 150° C./minute from 500° C. to 1760° C.; (3) the compacts were held for 120 minutes at 1760° C.; (4) the atmosphere was one atmosphere of flowing nitrogen flowing through the preheating region, the hot zone, and the Cooling region; and (5) the compacts were cooled in an unheated water-cooled cooling region. The batch processing parameters were: (1) placing the green compacts in graphite pots with a setting powder; (2) heating the compacts at 15° C./minute to the sintering temperature of between 1800–1825° C., and holding the compacts at the sintering temperature for 90 minutes under one atmosphere of nitrogen.

Table VI below sets forth the physical properties.

TABLE VI

Fracture Toughness($K_{IC}$(E&C)) and Vickers Hardness [18.5 Kg Load] of a Sintered Compact of Composition No. B Continuously-Processed and Batch-Processed

| Property | Example No. 13 [Batch Processed] | Example No. 14 [Continuously Processed] |
|---|---|---|
| Fracture Toughness ($K_{IC}$(E&C)) | 5.15 MPa m$^{1/2}$ | 5.43 MPa m$^{1/2}$ |
| Hardness (Vickers 18.5 kg load) | 14.64 GPa | 14.8 GPa |

A review of the test results shows that for these sintered compacts of Composition B, the continuously-processed sintered compacts exhibited a fracture toughness and a hardness that were greater than those of the batch-processed sintered compacts. The $K_{IC}$(E&C) fracture toughness is statistically significant at the ninety-five percent confidence level. This comparison shows that in addition to providing a sintered compact without a surface reaction layer, the continuously-processed sintered compacts had physical properties superior to those of the batch-processed sintered compacts.

In machining tests using Inconel 625 and Waspalloy as the workpiece material, the continuously-processed cutting inserts of Composition B had between about one and one-half and about three times the tool life as compared to the batch-processed cutting inserts of Composition B. The results of the testing on Waspalloy and Inconel 625 are set forth below.

In wet turning a jet engine housing comprised of AMS5707 Waspalloy, the operating parameters were a speed of 970 surface feet per minute (sfm) [295.6 surface meters per minute], a feed of 0.0035 inches [0.089 mm] per revolution, and a depth of cut of between about 0.05 inches to about 0.08 inches (1.27–2.03 mm) using a RCGV45T (0.004 inches by 20 degree chamfer) style cutting insert. From these tests it was found that where it normally took twenty batch-processed cutting inserts of Composition B to machine the part, it took only six to seven of the continuously-processed cutting inserts of Composition B to machine the part. This test shows that in this application, the continuously-processed cutting inserts had a tool life of about three times the tool life of the batch-processed cutting inserts.

In wet turning a AMS5666 Inconel 625 ring, the operating parameters were a speed of 770 surface feet per minute [234.7 surface meters per minute], a feed of between 0.005 and 0.009 inches [0.127–229 mm] per revolution, and a depth of cut of between about 0.05 inches and 0.08 inches [1.27–2.03 mm] using a RNG-45 honed (0.001–0.002 inch hone) style of cutting insert. The test results showed that the continuously-processed cutting inserts of Composition B had a tool life of between about 1.5 times to about 2 times the tool life of the batch-processed cutting inserts of Composition B.

In the wet turning of the AMS5707 Waspalloy material, as well as in the wet turning of the AMS5666 Inconel 625 material, the continuously-processed cutting inserts of composition B had better chipping resistance than the batch-processed cutting inserts of Composition B.

Results for turning Inconel 718 are set forth below in Table VII. The test conditions for this turning test were: a RNG-45T style cutting insert; a speed of 600 surface feet per minute (sfm) [182.9 surface meters per minute]; a feed of 0.006 inches per revolution [0.152 millimeters [mm] per revolution]; a depth of cut of 0.080 inches depth of cut [2.03 mm depth Of cut]; and flood coolant with sol 20:1.

TABLE VII

Turning Test Results for Turning Inconel 718

| Example | Rep. 1 Tool Life (minutes) | Rep. 2 Tool Life (minutes) | Rep. 3 Tool Life (minutes) | Rep. 4 Tool Life (minutes) | Average Tool Life (Minutes) |
|---|---|---|---|---|---|
| Example 15 [Composition A Continuously-Processed] | 4.2 | 5.2 | 5.4 | 4.5 | 4.8 |
| Example 16 [Composition A/ Batch-Processed] | 4.7 | 5.4 | 4.9 | 3.6 | 4.7 |

Table VII shows the results for four replications of each cutting insert. For all of the above tests set forth in Table VII, the failure mode was by maximum flank wear of 0.030 inches. In other words, the test was stopped and the tool life recorded in minutes when the flank wear reached 0.030 inches. A review of the test results set forth in Table VII shows that the tool life of the continuously-processed cutting insert of Composition A was essentially equivalent to the tool life of the batch-processed cutting insert of composition A.

The turning test results for turning Inconel 718 using continuously-processed cutting inserts of composition B as compared to batch-processed cutting inserts of composition B are set forth below in Table VIII. The test conditions for this turning test were: a RNG-45T style cutting insert; a speed of 600 surface feet per minute (sfm) [182.9 surface meters per minute]; a feed of 0.006 inches per revolution [0.152 mm per revolution]; a depth of cut of 0.080 inches depth of cut [2.03 mm depth of cut]; and flood coolant with sol 20:1.

TABLE VIII

Turning Test Results for Turning Inconel 718 Using Cutting insert Examples 17 and 18

| Example | Rep. 1 Tool Life (minutes) | Rep. 2 Tool Life (minutes) | Rep. 3 Tool Life (minutes) | Rep. 4 Tool Life (minutes) | Average Tool Life (Minutes) |
|---|---|---|---|---|---|
| Example 17 [Comp. B/ Continuously-Processed] | 6.0 | 7.4 | 6.7 | 8.0 | 7.0 |

TABLE VIII-continued

Turning Test Results for Turning Inconel 718 Using Cutting insert Examples 17 and 18

| Example | Rep. 1 Tool Life (minutes) | Rep. 2 Tool Life (minutes) | Rep. 3 Tool Life (minutes) | Rep. 4 Tool Life (minutes) | Average Tool Life (Minutes) |
|---|---|---|---|---|---|
| Example 18 [Comp. B/ Batch-Processed] | 8.5 | 7.6 | 6.7 | 7.7 | 7.6 |

Table VIII shows four replications for each cutting insert. For all of the examples the failure mode was maximum flank wear of 0.030 inches. Like for the tests set forth in Table VI, the failure mode was by maximum flank wear of 0.030 inches which meant that the test was stopped and the tool life recorded in minutes when the flank wear reached 0.030 inches. In regard to the test results set forth in Table VII, except for Rep. 1, the continuously-processed cutting inserts of Composition B had performance comparable to the batch-processed cutting inserts (Composition B).

A comparison of the microstructure of the continuously-processed cutting insert and the batch-processed cutting insert of Composition B showed that the continuously-processed cutting insert had superior microstructural properties. These microstructural differences may account for the performance improvement observed with the continuously-processed cutting inserts of Composition B over the batch-processed Cutting inserts of Composition B. A continuously-processed cutting insert of Composition B and a batch-processed cutting insert of Composition B were prepared for grain size measurements in the following fashion. After polishing, the inserts were etched in 450° C. molten KOH wherein the etch time was 35 seconds for each cutting insert. Grain measurements were completed on the batch-processed cutting insert of Composition B. But the grain boundaries had not etched sufficiently on the continuously-processed cutting insert of Composition B and a grain size comparison could not be completed.

Figure 11:
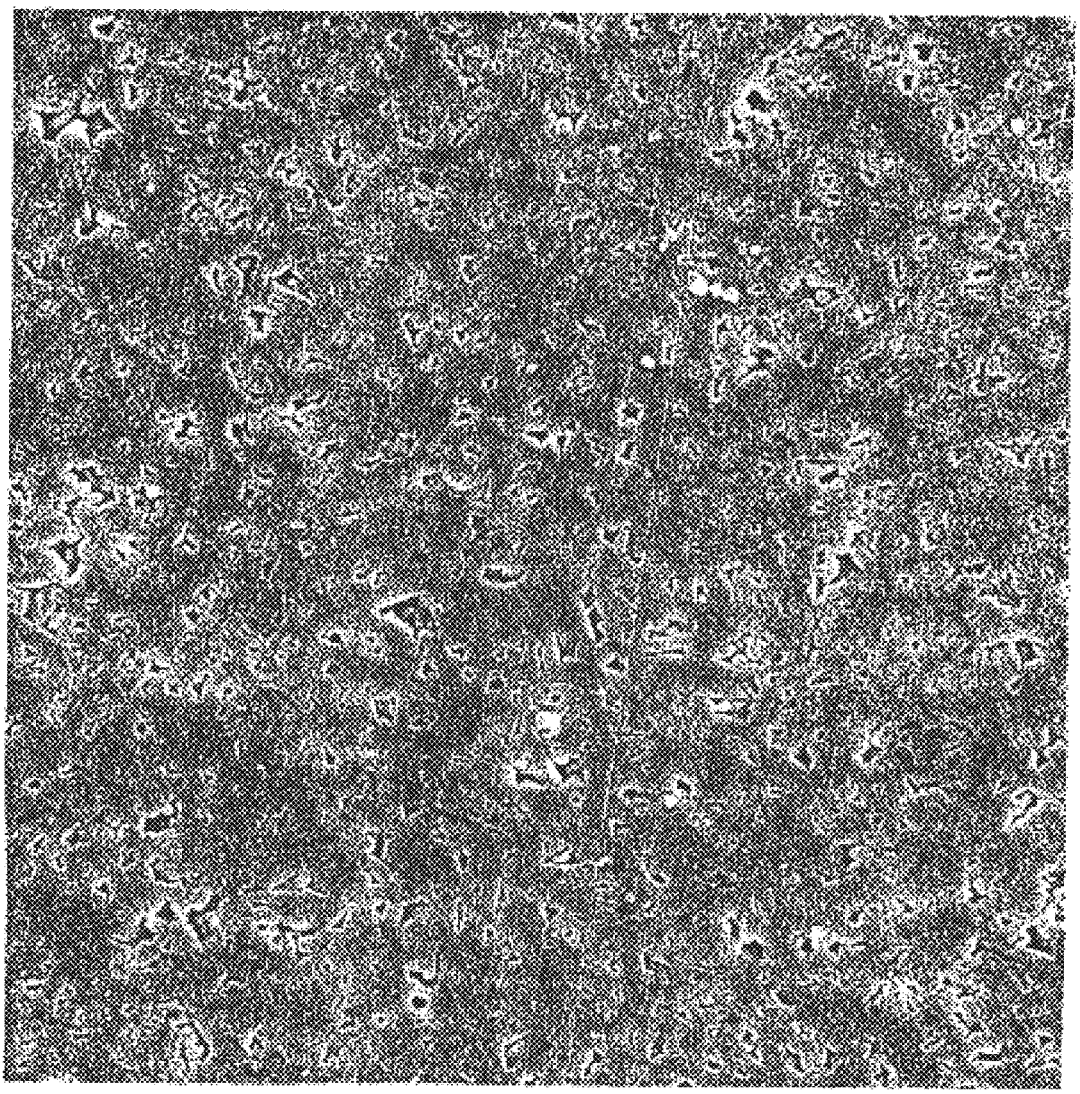
FIG. 11 is a photomicrograph at a magnification of 3560× (the width of the photomicrograph is 34 micrometers) of the microstructure of a continuously-processed SiAlON-based sintered compact of Composition B.
Figure 12:
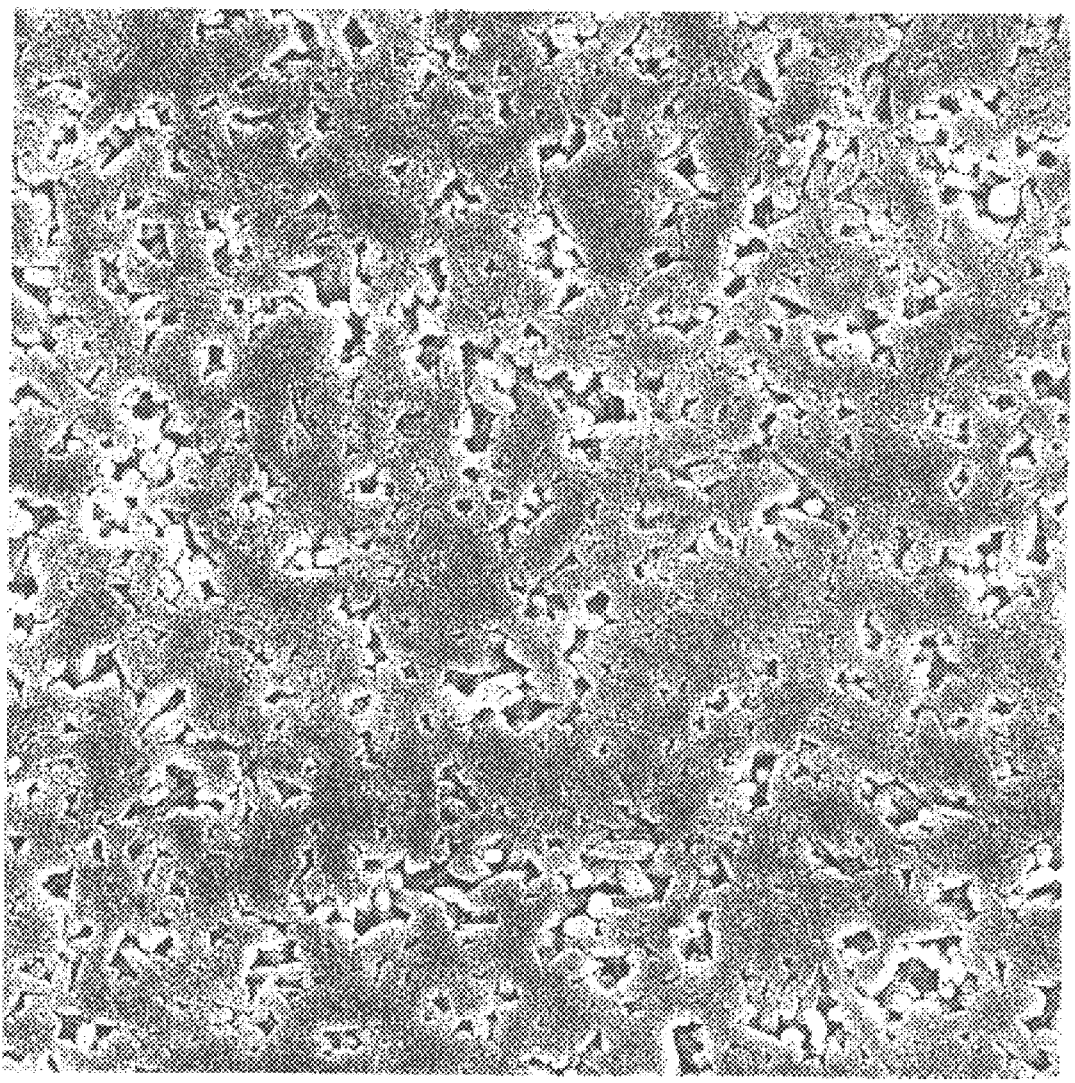
FIG. 12 is a photomicrograph at a magnification of 3560× (the width of the photomicrograph is 34 micrometers) of the microstructure of a batch-processed SiAlON-based sintered compact of composition B.

A difference in the multi grain glass pocket distribution appeared to exist between the continuously-processed and the batch-processed cutting inserts. FIGS. 11 and 12 presents the microstructure of the continuously-processed cutting insert and the batch-processed cutting insert, respectively. The jandel sigmascan pro V3 was used to compare the glass pocket sizes. The etched pockets had a grey level similar to the center of the SiAlON grains. So, measuring the glass pockets based on grey level distribution was difficult. Setting the grey level range so that dark regions of the grains were not included underestimated the pocket size. The final image analysis method was a single pass with the ranking filter. The rank was set at 9 dilating dark areas. Then three passes with the averaging convolution filter was completed. The divisor was set at 9. A binary image was made highlighting grey level range 0 to 60–67. This binary layer selected the center glass pocket region. A second binary layer highlighted the grey levels from 40 to 84. The upper limit could be lower and the lower limit higher depending on the SEM image contrast. This second layer overlapped the first is layer and captured a greater amount of the pocket. But regions in the SiAlQN grain centers were also highlighted in the second layer. The upper limit of the second layer was set so the glass pockets did not merge with regions extending from the grain center. The two layers were merged into a third binary layer. The objects in the third layer were measured and tabulated. The objects in the third layer were total areas. The objects in the second layer were tabulated and measured. If the second layer object was a grain center that area was the same as the its area in the third layer. But the area of the glass pocket in the second layer is reduced by the grey level that was in the first layer and not the second. Since the second layer formed a region around the first, the second layer objects were measured in the same order as the third layer. The grain center objects were eliminated by subtracting the second object area from the third. All values of 0 were grain centers. This resulted in a better estimation of the large glass pockets. But it did not sample the smaller pockets well. Some of these pockets would not be selected until the grey level reached the overlap region between the first and second layer. Therefore the second layer area would be the same as the third and these objects would be eliminated. Additional steps could be introduced to Capture this size range but were not because the coarse end is of interest.

The glass pockets were measured from four micrographs for each one of the cutting inserts (continuously-processed and batch-processed) of Composition B. The magnification was 2500x. Over two thousand glass pockets were measured from each one of the cutting inserts. The two glass pocket distributions were compared by the Mann-Whitney U Test. The major axis length distributions were compared. The Mann-Whitney U Test results in Table VIII found the difference in the two distributions to be very significant. The high Z value signifies a very high confidence that the distributions were different. The batch-processed cutting insert of Composition B had larger glass pockets than the continuously-processed cutting insert.

Figure 13:
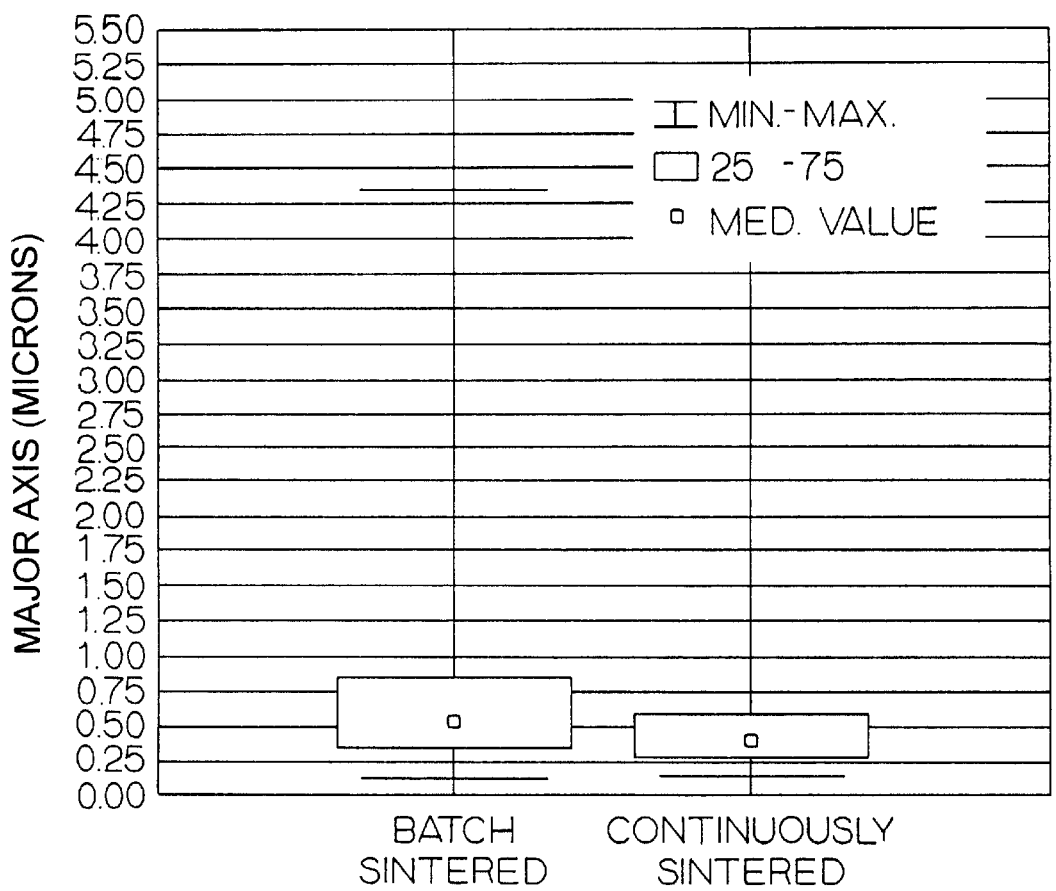
FIG. 13 is a box and whisker plot showing the dimension (microns) of the major axis of glass pockets for a continuously-processed (belt-sintered) SiAlON-based cutting insert of composition B and a batch-processed SiAlON-based cutting insert of Composition B.

Based on the histogram, ninety percent of the glass pockets in the continuously-processed cutting insert had a major axis length of 1 micron or less. While ninety percent of the glass pockets in the batch-processed cutting insert had a major axis length of 1.33 microns or less. The box and whisker plot depicts the difference in the distributions in FIG. 13.

The measurement method supports a difference in the glass distribution, but it under estimates the size of the glass pockets. The more uniform distribution of the glass pockets of the continuously-processed cutting insert could contribute to the improved resistance to chipping observed in the metal cutting field tests. The Mann-Whitley U Test results for these measurements are set forth in Table IX below.

TABLE IX

Mann-Whitley U Test Results for Measurement of Glass Pockets In Batch-Processed Cutting Inserts and Continuously-Processed Cutting Inserts

| | |
|---|---|
| Rank Sum Batch-Processed Cutting Inserts | 11829302 |

TABLE IX-continued

Mann-Whitley U Test Results for Measurement of
Glass Pockets In Batch-Processed Cutting Inserts
and Continuously-Processed Cutting Inserts

| | |
|---|---|
| Rank Sum Continuously-Processed Cutting Inserts | 12695225 |
| U | 4081879 |
| Z | 22.11 |

TABLE IX-continued

Mann-Whitley U Test Results for Measurement of
Glass Pockets In Batch-Processed Cutting Inserts
and Continuously-Processed Cutting Inserts

| | |
|---|---|
| p-level | 0 |
| Z adjusted | 22.11 |
| p-level | 0 |
| Valid N For Batch-Processed Composition B | 2853 |
| Valid N For Continuously Processed Composition B | 4150 |

The test results below in Table X and Table XI compare the milling properties of continuously-processed cutting insert of Composition C against a batch-processed cutting insert of Composition C. Table X below sets forth the composition and processing parameters for cutting insert Examples 19–25.

TABLE X

Composition and Processing Parameters for Cutting Insert Examples 19–24

| Example | Composition | Process | Temperature [° C.] (Continuous) | Time [minutes] (Continuous) |
|---|---|---|---|---|
| 19 | C | Continuous | 1826 | 60 |
| 20 | C | Continuous | 1826 | 120 |
| 21 | C | Continuous | 1826 | 180 |
| 22 | C | Continuous | 1826 | 60 |
| 23 | C | Continuous | 1826 | 180 |
| 24 | C | Batch | — | — |

In Table X, the term "Composition" refers to the composition of the example, the "Process" refers to the type of process (either continuous or batch), the "Temperature" refers to the maximum sintering temperature (° C.) for the continuously-processed cutting inserts, and the "Time" refers to the total time in minutes the cutting inserts were at the sintering temperature.

The test conditions for this turning test were: a SPG-633T style cutting insert; the workpiece material was Class 40 Gray Cast Iron; a speed of 3000 surface feet per minute (sfm) [914.5 surface meters per minute]; a feed of 0.009 inches per revolution [0.229 mm per revolution]; a depth of cut of 0.080 inches depth of cut [2.03 mm depth of cut]; the width of the cut was 3 inches [7.62 cm] by 24 inches [61 cm]; and dry milling using no coolant.

TABLE XI

Test Results from Milling Class 40 Gray Cast Iron (Solid Block)
Using Cutting Insert Examples 19–24

| Ex. | Rep. 1/ Passes | Rep. 1/ Tool Life | Rep. 1/ EOL | Rep. 2/ Passes | Rep. 2/ Tool Life | Rep. 2/ EOL | Avg. Tool Life (Passes) | Avg. Tool Life (Minutes) |
|---|---|---|---|---|---|---|---|---|
| 19 | 130.6 | 46.7 | fw | 130.5 | 46.7 | fw | 130.5 | 45.7 |
| 20 | 82.3 | 28.8 | fw | 77.1 | 27.0 | fw | 79.7 | 27.9 |
| 21 | 81.3 | 28.6 | fw | 106.4 | 36.9 | nw | 93.4 | 32.7 |
| 22 | 94.9 | 33.2 | fw | 88.0 | 30.8 | fw | 91.5 | 32.0 |
| 23 | 109.4 | 38.3 | fw | 32.0 | 11.2 | ch | 70.7 | 24.7 |
| 24 | 109.6 | 38.4 | fw | 88.0 | 30.8 | ch | 98.8 | 34.6 |

The end of tool life (EOL) criteria were: 0.015 inches flank wear (fw); 0.030 inches maximum flank wear (mfw); 0.030 inches nose wear (nw); and 0.030 inches depth of cut notch (dn) or chip (cp). The tool life reflects the actual chip cutting time in minutes.

The test results below in Table XII and Table XIII compare the milling properties of continuously-processed cutting inserts of Composition C against batch-processed cutting inserts of Composition C. Table XII below sets forth the composition and processing parameters for cutting insert Examples 25–28.

TABLE XII

Composition and Processing Parameters for Cutting Insert Examples 25–28

| Example | Composition | Process | Temperature [° C.] (Continuous) | Time [minutes] (Continuous) |
|---|---|---|---|---|
| 25 | C | Continuous | 1826 | 90 |
| 26 | C | Continuous | 1826 | 120 |
| 27 | C | Continuous | 1826 | 180 |
| 28 | C | Batch | — | — |

The test conditions for this turning test were: a SPG-633T style cutting insert; a speed of 3000 surface feet per minute (sfm) [914.5 surface meters per minute]; a feed of 0.006 inches per revolution [0.152 mm per revolution]; a depth of cut of 0.080 inches depth of cut [2.03 mm depth of cut]; the width of the cut was 3 inches [7.62 cm] by 24 inches [61 cm]; and dry milling using no coolant.

TABLE XIII

Test Results from Milling Class 40 Gray Cast Iron
(Solid Block) Using Cutting Insert Examples 25–28

| Ex. | Rep. 1/ Passes | Rep. 1/ Tool Life | Rep. 1/ EOL | Rep. 2/ Passes | Rep. 2/ Tool Life | Rep. 2/ EOL | Avg. Tool Life (Passes) | Avg. Tool Life (Minutes) |
|---|---|---|---|---|---|---|---|---|
| 25 | 69.2 | 36.0 | fw | 164.0 | 86.3 | fw | 116.6 | 80.6 |
| 26 | 43.2 | 22.6 | fw | 122.4 | 63.8 | nw | 82.8 | 43.1 |
| 27 | 44.1 | 22.9 | fw | 59.3 | 30.3 | nw ch | 51.2 | 26.6 |
| 28 | 45.2 | 23.5 | fw | 44.3 | 23.0 | nw ch | 44.8 | 23.3 |

The end of tool life (EOL) criteria were: 0.015 inches flank wear (fw); 0.030 inches maximum flank wear (mw); 0.030 inches nose wear (nw); and 0.030 inches depth of cut notch (dn) or chip (cp). The tool life reflects the actual chip cutting time in minutes.

Referring to the test results set out in Table XIII, it becomes apparent that the continuously processed cutting inserts of Composition C exhibited improved tool life. The cutting inserts that were held for 90 minutes at 1826° C. had an average tool life in minutes of 80.6 minutes and an average tool life in passes of 116.6 passes. The cutting inserts that were held for 120 minutes at 1826° C. had an average tool life in minutes of 43.1 minutes and an average tool life in passes of 82.2 passes. Both of these cutting inserts exhibited much better performance than the batch-processed cutting inserts, which had an average tool life in passes of 44.8 and an average tool life in minutes of 23.3 minutes. The cutting insert of Composition C held in the heating zones for 180 minutes an average tool life in passes of 51.2 passes and an average tool life in minutes of 26.6 minutes. The performance of this cutting insert (Example 27) was somewhat better than that of the batch-processed cutting insert (Example 28). Overall it seems that while all of the continuously-processed cutting inserts of Composition C had better performance than the batch-processed cutting insert, the continuously-processed cutting inserts held in the hearing zones for 60 minutes and 120 minutes (Examples 25 and 26, respectively) had much better performance characteristics.

The test results set forth in Table XIV and Table XV below reflect the results from turning tests of continuously-processed cutting inserts of Composition C as compared to batch-processed cutting inserts of Composition C. Table XIV below sets forth the composition and processing parameters for cutting insert Examples 29–32.

TABLE XIV

Composition and Processing
Parameters for Cutting Insert Examples 29–32

| Example | Composition | Process | Temperature [° C.] (Continuous) | Time [minutes] (Continuous) |
|---|---|---|---|---|
| 29 | C | Continuous | 1826 | 60 |
| 30 | C | Continuous | 1826 | 120 |
| 31 | C | Continuous | 1826 | 180 |
| 32 | C | Batch | — | — |

The test conditions for this turning test were: a SPG-633T style cutting insert with a lead angle of 16 degrees; a workpiece material of Class 40 Gray Cast Iron; a speed of 2000 surface feet per minute (sfm) [610 surface meters per minute]; a feed of 0.016 inches per revolution [0.406 mm per revolution]; a depth of cut of 0.100 inches depth of cut [2.54 mm depth of cut]; and dry turning using no coolant.

TABLE XV

Results of Turning Tests of Class 40 Gray Cast Iron
Using Cutting Insert Examples 29–32

| Ex. | Rep. 1/ TL | Rep. 1/ EOC | Rep. 2/ TL | Rep. 2/ EOC | Rep. 3/ TL | Rep. 3/ EOC | Rep. 4/ TL | Rep. 4/ EOC | Avg. Tool Life |
|---|---|---|---|---|---|---|---|---|---|
| 29 | 17.0 | nw mw | 16.0 | fw | 13.0 | fw | 9.0 | fw | 13.6 |
| 30 | 10.7 | fw | 11.5 | fw | 14.6 | fw | 10.7 | fw | 11.9 |
| 31 | 17.2 | mw | 16.1 | fw | 14.3 | fw ch | 10.6 | fw | 14.6 |
| 32 | 12.8 | fw | 12.6 | fw | 12.7 | fw | 9.3 | fw | 11.8 |

The end of tool life (EOL) criteria were: 0.015 inches flank wear (fw); 0.030 inches maximum flank wear (mw); 0.030 inches nose wear (nw); and 0.030 inches depth of cut notch (dn) or chip (cp). The tool life reflects the actual chip cutting time in minutes.

In regard to the test results set forth in Tables XIV and XV, the continuously-processed cutting inserts of Composition C displayed better performance in turning Class 40 Gray cast iron than the batch-processed cutting insert. The continuously-processed cutting insert held at 1826° C. for 180 minutes (Example 31) exhibited the longest average tool life of 14.6 minutes as compared to the batch-processed cutting insert (Example 32) which had an average tool life of 11.8 minutes. The continuously-processed cutting inserts held at 1826° C. for 60 minutes (Example 29) and 120 minutes (Example 30) had average tool lives of 13.6 minutes and 11.9 minutes, respectively.

Applicant contemplates that the cutting inserts as described above may be coated with a refractory coating for improved wear resistance. Conventional coating techniques may be used to coat these cutting inserts such as chemical vapor deposition and physical vapor deposition. Exemplary coating materials include alumina, titanium carbonitride and titanium nitride.

Ceramic compacts of Composition A were continuously processed in a furnace along the lines of the furnace described in U.S. Pat. No. 5,648,042, except that the furnace had four heating zones. Each heating zone was twelve inches long and was held at a temperature of 1800° C. The belt speed was 0.4 inches per minute so that the total time the green compacts spent in the heating zones was 120 minutes. The green ceramic compacts were placed in trays wherein some of the green compacts had boron nitride setting powder thereon to keep the parts from sticking together. Some of the green compacts did not use any setting powder.

As mentioned above, batch-processed ceramic parts of Composition A typically form a surface reaction layer. This surface reaction layer generally is comprised of $\alpha'$-SiAlON and $\beta'$-SiAlON and B phase ($Y_2SiAlO_5N$). The presence of the B phase in the surface reaction layer reduces toughness and would result in a decrease in tool performance if not removed.

Continuously-processed ceramic parts did not have this B phase ($Y_2SiAlO_5N$) in the surface reaction layer, but instead, exhibited a surface zone of $\alpha'$-SiAlON and $\beta'$-SiAlON which had a higher content of $\alpha'$-SiAlON than the bulk substrate. This surface zone extended inwardly from the surface of the substrate a distance of about 0.005 inches (0.127 mm).

The X-ray diffraction patterns (FIGS. 15 through 17) show the presence of the higher $\alpha'$-SiAlON in the surface region. More specifically, for an exposed surface of a cutting insert of Composition A held at 1800° C. for 120 minutes, FIG. 16 shows the $\alpha'$-SiAlON content to be 83.8 weight percent and the $\beta'$-SiAlON content to be 16.2 weight percent. This exposed surface was the top surface in the sinter box, and thus, experienced the greatest exposure to the sintering atmosphere and the greatest potential for volatilization during sintering. Even though this exposed surface was subjected to the greatest potential for compositional change during sintering, it still reflected a high $\alpha'$-SiAlON content in the surface region.

Figure 15:
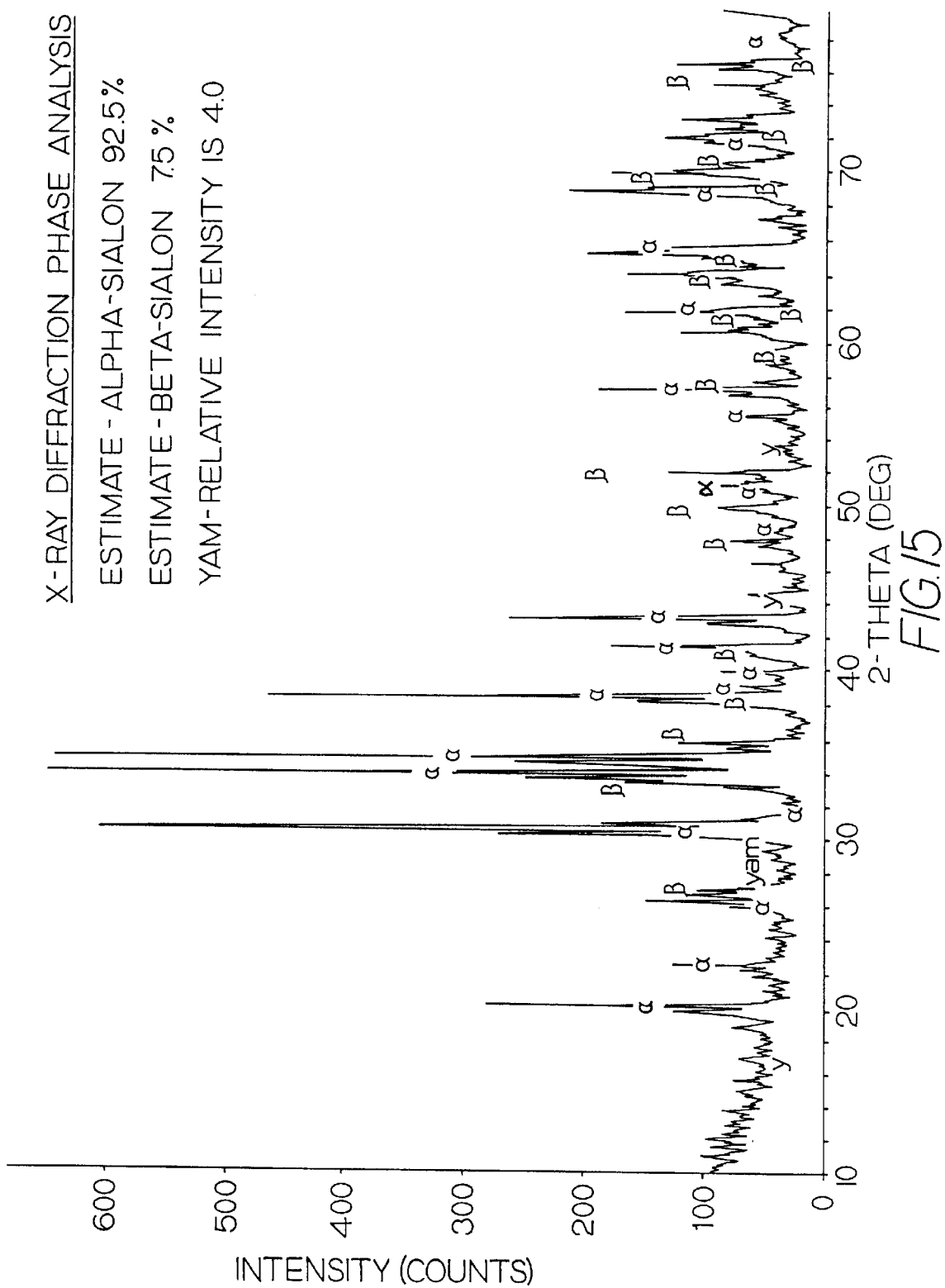
FIG. 15 is an X-ray diffraction pattern of a partially exposed surface of a cutting insert of Composition A held at 1800° C. for 120 minutes.
Figure 16:
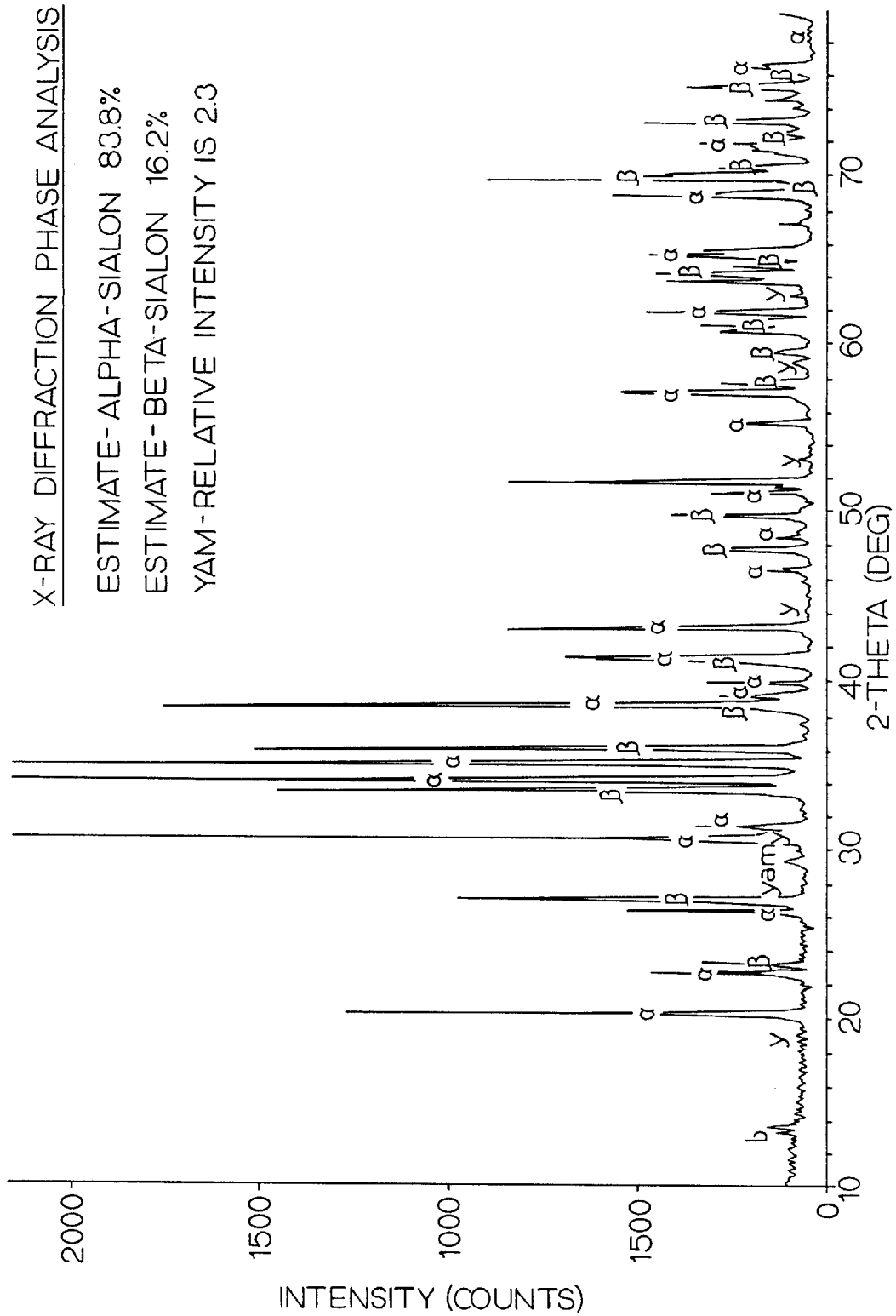
FIG. 16 is an X-ray diffraction pattern of an exposed surface of a cutting insert of Composition A held at 1800° C. for 120 minutes.

For one surface of the cutting insert of Composition A held at 1800° C. for 120 minutes stacked on another cutting insert, i.e., the stacked (or partially exposed) surface, FIG. 15 shows a higher $\alpha'$-SiAlON content than that of the exposed surface. The higher $\alpha'$-SilAlON content is due to the fact that the stacked surface was protected to some extent from (or was partially exposed to) the sintering atmosphere (or furnace environment) while the exposed surface was in direct exposure to (or contact with) the sintering atmosphere. It is important to appreciate that even though the local sintering environments for the exposed surface and the stacked surface were different, both surfaces had a high $\alpha'$-SiAlON content in the surface regions thereof.

Figure 17:
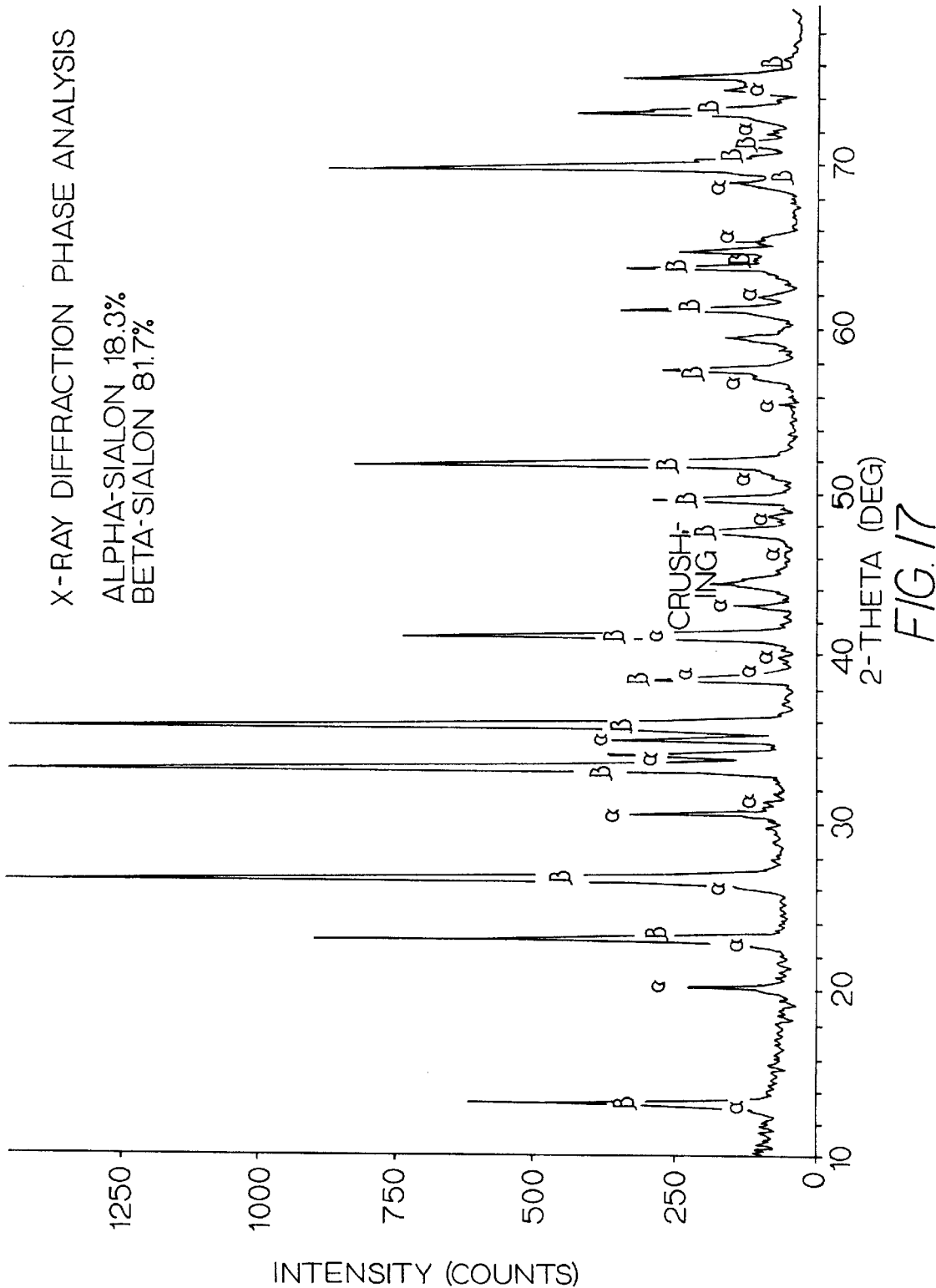
FIG. 17 is an X-ray diffraction pattern of the bulk of a cutting insert of Composition A held at 1800° C. for 120 minutes.

For the bulk of the cutting insert of Composition A held at 1800° C. for 120 minutes, FIG. 17 shows the $\alpha'$-SiAlON content to be 18.3 weight percent and the $\beta'$-SiAlON content to be 81.7 weight percent. In order to obtain this data, a cutting insert was crushed prior to running the X-ray diffraction procedure.

In measuring the content of the surface region for a number of cutting inserts, it was found that in the surface region the $\alpha'$-SiAlON content ranged between 57 weight percent to 92 weight percent with minor amounts of YAM and the balance $\beta'$-SiAlON. The bulk composition of the ceramic was 20 weight $\alpha'$-SiAlON and 80 weight percent $\beta'$-SiAlON. Although no tests were conducted, it would be expected that the metalcutting properties of such a ceramic would be good since the $\alpha'$-SiAlON phase is about thirty percent harder than the $\beta'$-SiAlON phase.

It is apparent that applicant has developed a process, i.e., the continuous process, for the manufacture of ceramics (e.g. cutting inserts) [or sintered compacts], including without limitation SiAlON-based cutting inserts and silicon nitride-based cutting inserts, which have a number of improved properties. These properties pertain to the appearance of the ceramic and the performance of the ceramic cutting insert.

The use of the continuous process essentially eliminates the presence of a surface reaction layer on the surface of the sintered compact. The absence of the surface reaction layer eliminates a grinding step from the overall processing of the ceramic. This, of course, saves time and money in the manufacture of the ceramic. Even if there is some surface reaction layer, in the continuous process the depth of the surface reaction layer is much less than in the batch-processed sintered compacts. A thinner surface reaction layer requires less grinding than for the batch-processed sintered compact, and hence, also saves time and money in the manufacturing process. The use of the continuous process provides for a sintered compact which does not require any, or as much, grinding to achieve an acceptable surface appearance so that such a continuous process saves time and money over the batch-processing of the ceramic parts.

The use of a continuous process also allows the green compacts to remain in the same container for both the delubing process and the continuous sintering process. By the green compacts remaining in the same container, there is a cost savings associated with eliminating the need to transfer the delubed-green compacts into a container for processing.

Testing of continuous-processed cutting inserts against batch-processed cutting inserts show that the continuously-processed cutting inserts exhibit comparable or in some cases improved physical properties to the batch-processed cutting inserts. Testing also shows that the continuously-processed cutting inserts show improved performance properties in some applications as compared to batch-processed cutting inserts.

Overall, applicant has provided a process which provides for cost and labor savings thereby making the manufacturing process for efficient and profitable. Applicant has also provided a process, i.e., the continuous process, which produces a ceramic part (e.g., cutting insert and sintered compact) with improved or comparable physical properties, as well as improved or comparable performance properties, with respect to batch-processed ceramic parts (e.g., cutting inserts and sintered compacts).

The continuous process would appear to have application to the manufacture of ceramics (and sintered compacts) wherein the ceramic materials include, in addition to SiAlON-based materials and silicon nitride-based materials, alumina, alumina-based ceramics (e.g., alumina+titanium carbide, alumina+zirconia, alumina+zirconia+silicon carbide whisker, and alumina+silicon carbide whiskers), zirconia, zirconia-based ceramics, titanium carbide-based ceramics, titanium nitride-based ceramics, titanium carbonitride-based ceramics, (e.g., titanium carbonitride+ silicon carbide whiskers +alumina), titanium boride-based ceramics, hafnium boride-based ceramics, zirconium boride-based ceramics and the like. The silicon nitride-based materials may include a ceramic with a starting powder composition of silicon nitride (e.g., 98.0 weight percent), small amounts (e.g., 1.0 weight percent) of magnesia, small amounts (e.g., 1.0 weight percent) of yttria, and their equivalents as described in U.S. Pat. No. 5,525,134.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A continuous process for the manufacture of a ceramic sintered cutting insert body wherein the process comprises the steps of:

forming a green compact from a powder mixture comprising a first component comprising compounds which contain elements of silicon, aluminum, oxygen and nitrogen; and the powder mixture further comprising a second component comprising a compound of at least one element selected from the group consisting of yttrium, scandium, cerium, lanthanum and the metals of the lanthanide series, and the second component comprising between 0.1 and 10 weight percent of the powder mixture;

heat treating the green compact wherein the heat treatment comprises continuously passing the green compact through at least one heating zone so as to produce the sintered cutting insert body, and wherein the one heating zone is at a temperature of greater than or equal to 1760 degrees Centigrade; and wherein the sintered cutting insert body comprising SiAlON grains and an intergranular phase disposed between the SiAlON grains wherein the intergranular phase comprising glass pockets having a uniform distribution.

2. The process according to claim 1 wherein the ceramic material comprising a two-phase composite of alpha'-SiAlON phase and beta'-SiAlON phase, and a glassy phase; and wherein the alpha'-SiAlON phase ranges from 10 to 70 weight percent of the ceramic material, the beta'-SiAlON phase ranges from 20 to 90 weight percent of the ceramic material, and the glassy phase ranges from 0.1 to 10 weight percent of the ceramic material.

3. The process according to claim 2 wherein the glassy phase may also contain a crystalline phase from the group consisting of YAG, YAM, N-YAM, and Y-N-α-Wollastonite.

4. The process according to claim 2 wherein the ceramic material has the following physical properties: a fracture toughness $K_{IC}$ between about 5.93 and about 6.69 MPa $m^{1/2}$, a hardness of between about 15.68 and about 16.30 GPa, and a density of between about 3.24 and about 3.26 grams per cubic centimeter.

5. The process according to claim 2 wherein the beta'-SiAlON phase has the formula $Si_{6-z}Al_zO_zN_{8-z}$ wherein z ranges between 0.38 and 1.5.

6. The process according to claim 5 wherein z is equal to about 0.8.

7. The process according to claim 1 wherein the heating zone is at a temperature between 1760° C. and about 1800° C. and the green compact is in the heating zone for a time between about sixty minutes and one hundred twenty minutes.

8. The process according to claim 1 wherein the forming step comprises: milling the powder components; agglomerating the powder components with lubricant; and compacting the luburicant-agglomerated powder mixture into the green compact.

9. The process according to claim 8 wherein prior to the heat treating step, there is the step of delubing the green compact.

10. The process according to claim 9 wherein the green compact moves continuously from the delubing step to the heat treating step.

11. The process according to claim 1 wherein prior to the heat treating step, the green compact is placed in a container without any setting powder; and the container carrying the green compact is placed on a belt which passes the container and green compact through the one heating zone.

12. The process according to claim 11 wherein the belt moves at a linear speed so as to control the duration of the green compact in the one heating zone.

13. The process according to claim 1 wherein the heat treatment further comprises subjecting the green compact to one atmosphere of flowing nitrogen.

14. The process according to claim 2 wherein the SiAlON grains comprises at least 50 volume percent of the ceramic;

wherein the ceramic has lass than 1 volume percent porosity;

wherein at least 70 volume percent of the SiAlON is beta'-SiAlON phase and the intergranular phase forms 5 to 15 volume percent of the ceramic; and wherein the beta-SiAlON phase has a Z value of greater than 0.4 but less than 4.

15. The process according to claim 14 wherein the Z value of the beta'-SiAlON phase is about 3.

16. The process according to claim 14 wherein the ceramic material has the following physical properties: a fracture toughness $K_{IC}$ between about 5.70 and about 6.01 MPa $m^{1/2}$, a hardness of between about 14.66 and about 15.10 GPa, and a density of between about 3.18 and about 3.19 grams per cubic centimeter.

17. The process according to claim 14 wherein at least ninety percent of the glass pockets have a major dimension being less than or equal to one micron.

18. The process according to claim 14 wherein the beta'-SiAlON phase comprises at least about 85 volume percent of the SiAlON.

19. The process according to claim 14 wherein the beta'-SiAlON phase comprises about 100 volume percent of the SiAlON.

20. The process according to claim 14 wherein the ceramic material includes one or refractory materials selected from the group consisting of titanium nitride, titanium carbonitride, titanium carbide, hafnium nitride, hafnium carbonitride, hafnium carbide, zirconium nitride, zirconium carbonitride, and zirconium carbide.

21. The process according to claim 1 wherein the sintered compact does not have a surface reaction layer.

22. The process according to claim 1 wherein the sintered compact has a surface reaction layer with a depth of no greater than 0.005 inches.

23. The process according to claim 1 further including the step of treating the sintered cutting insert body to form a cutting insert.

24. The process according to claim 23 further including the step of coating at least a portion of the cutting insert with a refractory coating.

25. The process according to claim 24 wherein the refractory coating is selected from the group consisting of alumina, titanium nitride and titanium carbonitride.

26. The process according to claim 14 wherein z is equal to about 0.4.

27. The process according to claim 1 wherein the heat treating step includes continuously passing the green compact through at least two heating zones so as to form the sintered compact, and wherein each one of the heating zones is at a temperature greater than 1760 degrees Centigrade.

28. The process according to claim 27 wherein one of the heating zones is at a temperature of about 1800 degrees Centigrade.

29. The process according to claim 1 wherein the compounds that comprise the first component include silicon nitride aluminum nitride and alumina.

30. The process according to claim 1 wherein the sintered cutting insert body having an as-molded rake face and an as-molded flank face, and the rake face intersecting with the flank face to form a cutting edge at the intersection, and the cutting insert body having at least one of the as-molded rake face and the as-molded flank face does not have a surface reaction layer.

31. The process according to claim 30 wherein at least one of the as-molded rake face and as-molded flank face has a surface reaction layer to a depth of no greater than 0.005 inches.

32. The process according to claim 2 further including the step of coating the sintered cutting insert body.

33. The process according to claim 2 wherein the sintered cutting insert body comprises:

a substrate comprising a two-phase composite of alpha'-SiAlON and beta'SiAlON, and a glassy phase;

the substrate presenting a surface, the substrate having a surface region extending inwardly from the surface, and the substrate having a bulk region beneath the surface region; and the surface region having a higher alpha'-SiAlON content than the bulk region.

34. The process according to claim 33 wherein the content of alpha'-SiAlON in the surface region is between about two hundred percent to about five hundred percent greater than the alpha'-SiAlON content in the bulk region.

35. The process according to claim 33 wherein the alpha'-SiAlON content in the surface region ranges between about 57 weight percent and about 92 weight percent, and the alpha'-SiAlON content in the bulk region comprises about 20 weight percent.

36. The process according to claim 33 wherein the surface region includes beta'-SiAlON, and the beta'-SiAlON content in the surface region being less than the beta'-SiAlON content in the bulk region.

* * * * *